(12) United States Patent
Chang

(10) Patent No.: US 8,194,417 B2
(45) Date of Patent: Jun. 5, 2012

(54) TWO-STAGE SWITCHING POWER SUPPLY

(75) Inventor: Shih-Hsien Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 360 days.

(21) Appl. No.: 12/693,403

(22) Filed: Jan. 25, 2010

(65) Prior Publication Data
US 2010/0225289 A1 Sep. 9, 2010

(30) Foreign Application Priority Data

Mar. 9, 2009 (TW) ................................ 98107595 A

(51) Int. Cl.
*H02M 3/335* (2006.01)
(52) U.S. Cl. ........................................................ 363/16
(58) Field of Classification Search ................... 363/16, 363/21.02, 21.03
See application file for complete search history.

(56) References Cited

U.S. PATENT DOCUMENTS
8,027,174 B2 * 9/2011 Ryu et al. ......................... 363/16
* cited by examiner

*Primary Examiner* — Shawn Riley

(57) ABSTRACT

A two-stage switching power supply includes a first-stage power circuit, a second-stage power circuit, an output detecting circuit and a power control unit. The first-stage power circuit includes a first switching circuit. By conducting or shutting off the first switching circuit, an input voltage is converted into a bus voltage. The second-stage power circuit includes a second switching circuit. By conducting or shutting off the second switching circuit, the bus voltage is converted into an output voltage. The output detecting circuit generates an output detecting signal according to the output voltage. The power control unit controls operations of the first and second switching circuits according to the output detecting signal. A first-stage voltage gain value of the first-stage power circuit and a second-stage voltage gain value of the second-stage power circuit are altered with the output detecting signal, so that the output voltage is maintained at a rated value.

20 Claims, 12 Drawing Sheets

TWO-STAGE SWITCHING POWER SUPPLY

CLAIM OF PRIORITY

This application claims priority to Taiwanese Patent Application No. 098107595 filed on Mar. 9, 2009.

FIELD OF THE INVENTION

The present invention relates to a power supply, and more particularly to a two-stage switching power supply.

BACKGROUND OF THE INVENTION

With increasing industrial development, diverse electronic devices are used to achieve various purposes. An electronic device comprises a plurality of electronic components. Generally, different kinds of electronic components are operated by using different voltages.

As known, a power supply is essential for many electronic devices such as personal computers, industrial computers, servers, communication products or network products. Usually, the user may simply plug a power supply into an AC wall outlet commonly found in most homes or offices so as to receive an AC voltage. The power supply will convert the AC voltage into a regulated DC output voltage for powering the electronic device. The regulated DC output voltage is transmitted to the electronic device through a power cable.

Generally, power supply apparatuses are classified into two types, i.e. a linear power supply and a switching power supply (SPS). A linear power supply principally comprises a transformer, a diode rectifier and a capacitor filter. The linear power supply is advantageous due to its simplified circuitry and low fabricating cost. Since the linear power supply has bulky volume, the linear power supply is not applicable to a slim-type electronic device. In addition, the converting efficiency of the linear power supply is too low to comply with the power-saving requirements. In comparison with the linear power supply, the switching power supply has reduced volume but increased converting efficiency. That is, the switching power supply is applicable to the slim-type electronic device and may meet with the power-saving requirements.

The conventional two-stage switching power supply comprises a first-stage power circuit and a second-stage power circuit. By the first-stage power circuit, an input AC voltage is converted into a bus voltage having a constant voltage value. By the second-stage power circuit, the bus voltage is converted into an output voltage having a rated voltage value, which is required for powering an electronic device. Generally, the magnitude of the input AC voltage needs to be maintained within a specified range (e.g. 100~120V) in order to generate the constant bus voltage by the first-stage power circuit. If the magnitude of the input AC voltage is beyond the specified range, the magnitude of the bus voltage is also beyond the predetermined voltage value. Since the second-stage power circuit is designed to receive the constant bus voltage (e.g. 110V) and generate the output voltage, the magnitude of the output voltage is also altered as the magnitude of the bus voltage is changed.

From the above discussion, the variation amount of the input AC voltage is very tiny in order to allow the first-stage power circuit to generate the constant bus voltage. If the magnitude of the bus voltage is beyond the predetermined voltage value, the output voltage generated by the second-stage power circuit fails to be maintained at the rated voltage value. If the input AC voltage is subject to a sudden variation or interruption (e.g. from a lightning stroke or activation of a motor), the output voltage is also subject to a sudden variation or interruption. Moreover, the conventional two-stage switching power supply has an additional power factor correction (PFC) circuit for achieving a power factor correction purpose. As known, the PFC circuit increases complexity of the whole two-stage switching power supply and increases the fabricating cost.

Therefore, there is a need of providing an improved two-stage switching power supply so as to obviate the drawbacks encountered from the prior art.

SUMMARY OF THE INVENTION

An object of the present invention provides a two-stage switching power supply for maintaining the output voltage or the output current at the rated value by using an adjustable bus voltage.

Another object of the present invention provides a simplified and cost-effective two-stage switching power supply.

In accordance with an aspect of the present invention, there is provided a two-stage switching power supply for receiving an input voltage and generating an output voltage. The two-stage switching power supply includes a first-stage power circuit, a second-stage power circuit, an output detecting circuit and a power control unit. The first-stage power circuit is connected to a power bus for receiving an input voltage, and includes a first switching circuit. By conducting or shutting off the first switching circuit, the input voltage is converted into a bus voltage. The second-stage power circuit is connected to the power bus for receiving the bus voltage, and includes a second switching circuit. By conducting or shutting off the second switching circuit, the bus voltage is converted into the output voltage. The output detecting circuit is connected to the second-stage power circuit and generates an output detecting signal according to the output voltage and/or an output current. The power control unit is connected to a control terminal of the first switching circuit of the first-stage power circuit and a control terminal of the second switching circuit of the second-stage power circuit for controlling operations of the first switching circuit and the second switching circuit according to the output detecting signal. A first-stage voltage gain value of the first-stage power circuit and a second-stage voltage gain value of the second-stage power circuit are altered as the output detecting signal is changed, so that the output voltage or the output current is maintained at a rated value, wherein the bus voltage is dynamically adjusted according to the output detecting signal.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
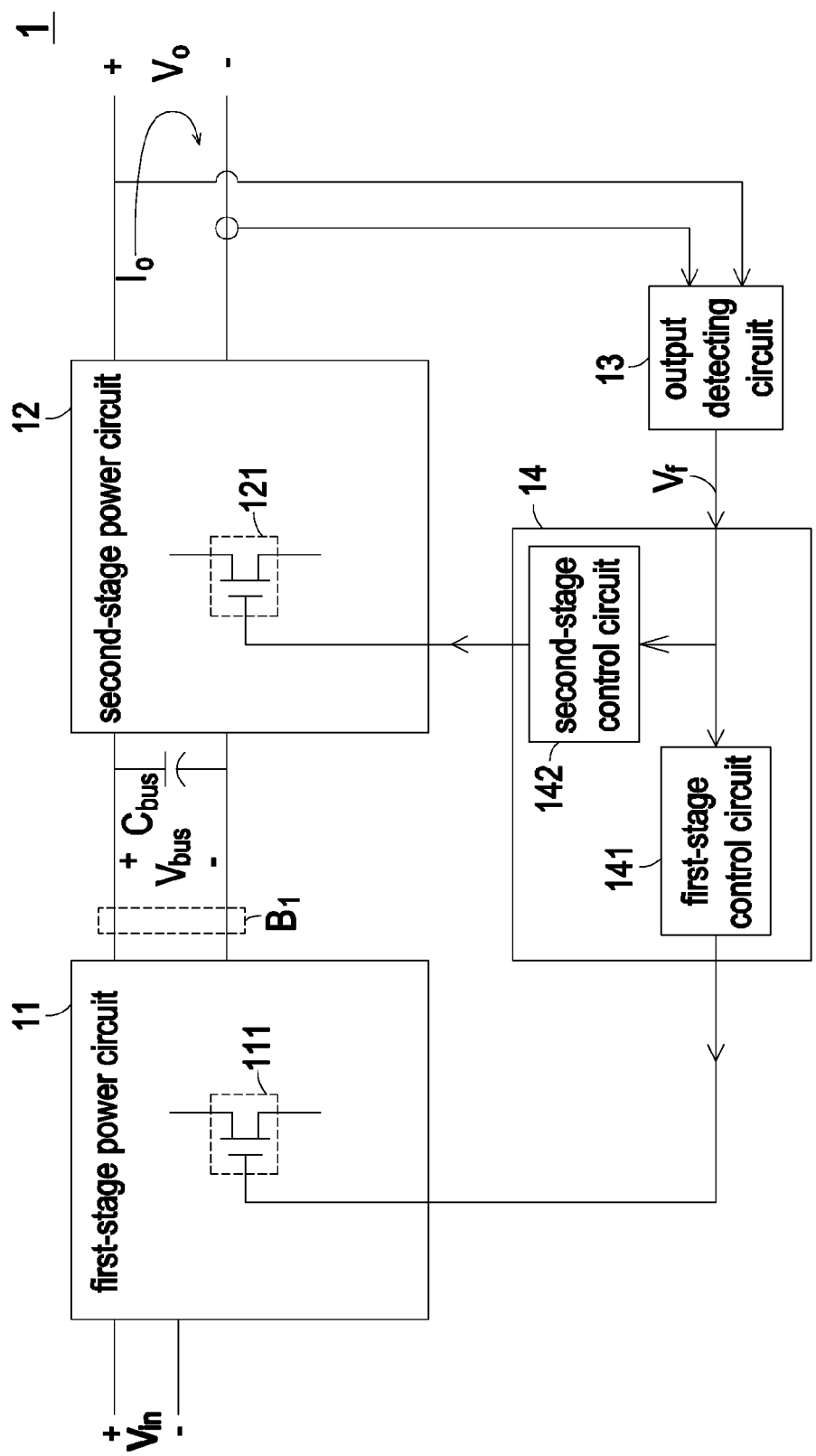
FIG. 1 is a schematic circuit diagram of a two-stage switching power supply according to an embodiment of the present invention.

FIG. 1 is a schematic circuit diagram of a two-stage switching power supply according to an embodiment of the present invention. The two-stage switching power supply 1 is used for receiving an input voltage $V_{in}$ and generating an output voltage $V_o$ or an output current $I_o$. The two-stage switching power supply 1 comprises a first-stage power circuit 11, a second-stage power circuit 12, an output detecting circuit 13 and a power control unit 14.

The first-stage power circuit 11 comprises a first switching circuit 111. The first-stage power circuit 11 is connected to the power bus $B_1$ and a first-stage control circuit 141 of the power control unit 14. When the first switching circuit 111 is alternatively conducted or shut off, the input voltage $V_{in}$ is converted into a bus voltage $V_{bus}$ by the first-stage power circuit 11.

The second-stage power circuit 12 comprises a second switching circuit 121. The second-stage power circuit 12 is connected to the power bus $B_1$ and a second-stage control circuit 142 of the power control unit 14. When the second switching circuit 121 is alternatively conducted or shut off, the bus voltage $V_{bus}$ is converted into the output voltage $V_o$ or the output current $I_o$ by the second-stage power circuit 12. The output detecting circuit 13 is connected to the power output terminal of the second-stage power circuit 12, and the first-stage control circuit 141 and the second-stage control circuit 142 of the power control unit 14. According to the output voltage $V_o$ and/or the output current $I_o$, the output detecting circuit 13 generates a corresponding output detecting signal $V_f$.

The power control unit 14 is connected to the control terminal of the first switching circuit 111 of the first-stage power circuit 11, the control terminal of the second switching circuit 121 of the second-stage power circuit 12 and the output terminal of the output detecting circuit 13. The operations of the first switching circuit 111 and the second switching circuit 121 are controlled according to the output detecting signal $V_f$. A first-stage voltage gain value $G_1$ of the first-stage power circuit 11 and a second-stage voltage gain value $G_2$ of the second-stage power circuit 12 are altered as the output detecting signal $V_f$ is changed. In other words, the first-stage voltage gain value $G_1$ of the first-stage power circuit 11 and the second-stage voltage gain value $G_2$ of the second-stage power circuit 12 are altered as the output voltage $V_o$ and/or the output current $I_o$ is changed. The first-stage voltage gain value $G_1$ of the first-stage power circuit 11 is equal to a ratio of the input voltage $V_{in}$ to the bus voltage $V_{bus}$, i.e. $G_1 = V_{bus}/V_{in}$. The second-stage voltage gain value $G_2$ of the second-stage power circuit 12 is equal to a ratio of the bus voltage $V_{bus}$ to the output voltage $V_o$, i.e. $G_2 = V_o/V_{bus}$.

In this embodiment, the power control unit 14 comprises the first-stage control circuit 141 and the second-stage control circuit 142. The power control unit 14 is connected to the output terminal of the output detecting circuit 13 and the control terminal of the first switching circuit 111 of the first-stage power circuit 11. According to the output detecting signal $V_f$ generated by the output detecting circuit 13, the first-stage control circuit 141 controls operations of the first switching circuit 111. As a consequence, the first-stage voltage gain value $G_1$ of the first-stage power circuit 11 is altered as the output detecting signal $V_f$ is changed. The second-stage control circuit 142 is connected to the output terminal of the output detecting circuit 13 and the control terminal of the second switching circuit 121 of the second-stage power circuit 12. According to the output detecting signal $V_f$ generated by the output detecting circuit 13, the second-stage control circuit 142 controls operations of the second switching circuit 121. As a consequence, the second-stage voltage gain value $G_2$ of the second-stage power circuit 12 is altered as the output detecting signal $V_f$ is changed.

The first switching circuit 111 of the first-stage power circuit 11 is controlled by the first-stage control circuit 141 of the power control unit 14 according to a pulse width modulation (PWM) technology. By adjusting the duty cycle of the first switching circuit 111, the first-stage voltage gain value $G_1$ of the first-stage power circuit 11 is altered. In an embodiment, the first-stage voltage gain value $G_1$ of the first-stage power circuit 11 is in direct proportion to the duty cycle of the first switching circuit 111. As the duty cycle of the first switching circuit 111 is increased by the first-stage control circuit 141 of the power control unit 14, the first-stage voltage gain value $G_1$ of the first-stage power circuit 11 is correspondingly increased.

Similarly, the second switching circuit 121 of the second-stage power circuit 12 is controlled by the second-stage control circuit 142 of the power control unit 14 according to a pulse width modulation (PWM) technology. By adjusting the operating frequency of the second switching circuit 121, the second-stage voltage gain value $G_2$ of the second-stage power circuit 12 is altered. The second-stage voltage gain value $G_2$ of the second-stage power circuit 12 is in reverse proportion to the duty cycle of the second-stage power circuit 12. As the operating frequency of the second switching circuit 121 is increased by the second-stage control circuit 142 of the power control unit 14, the second-stage voltage gain value $G_2$ of the second-stage power circuit 12 is correspondingly decreased.

The operations of the first switching circuit 111 and the second switching circuit 121 are respectively controlled by the first-stage control circuit 141 and the second-stage control circuit 142 of the power control unit 14 according to the output detecting signal $V_f$, which is altered as the output voltage $V_o$ or the output current $I_o$ is changed. In other words, as the first-stage voltage gain value $G_1$ of the first-stage power circuit 11 and the second-stage voltage gain value $G_2$ of the second-stage power circuit 12 are altered, the output voltage $V_o$ or the output current $I_o$ is maintained at the rated value. The bus voltage $V_{bus}$ is altered as the output voltage $V_o$ or the output current $I_o$ is changed. In accordance with the key feature, due to an adjustable bus voltage $V_{bus}$, the output voltage $V_o$ or the output current $I_o$ is maintained at the rated value.

In other words, the bus voltage $V_{bus}$ outputted from the first-stage power circuit 11 is not necessarily constant. By dynamically adjusting the first-stage voltage gain value $G_1$ of the first-stage power circuit 11 and the second-stage voltage gain value $G_2$ of the second-stage power circuit 12, the output voltage $V_o$ or the output current $I_o$ can be maintained at the rated value. As such, the operating flexibilities of the first switching circuit 111 and the second switching circuit 121 will be enhanced. Moreover, the two-stage switching power supply 1 has a broader variation range of the input voltage $V_{in}$.

For example, the output voltage $V_o$ is equal to the product of the first-stage voltage gain value $G_1$ and the second-stage voltage gain value $G_2$, i.e. $V_o=G_1 \times G_2 \times V_{in}$. Assuming that the rated voltage value of the input voltage $V_{in}$ is 100V and the rated voltage value of the output voltage $V_o$ is 300V, the operations of the first switching circuit 111 and the second switching circuit 121 are respectively controlled by the first-stage control circuit 141 and the second-stage control circuit 142, so that the product of the first-stage voltage gain value $G_1$ and the second-stage voltage gain value $G_2$ is 3.

Since the operating flexibilities of the first switching circuit 111 and the second switching circuit 121 are enhanced, the variation range of the input voltage $V_{in}$ could be broader. Under this circumstance, if the input voltage $V_{in}$, is subject to a sudden variation or interruption, the adverse influence on the output voltage $V_o$ is minimized. For example, assuming the first-stage voltage gain value $G_1$ is adjusted be ranged from 1 to 10 and the second-stage voltage gain value $G_2$ is adjusted to be ranged from 1 to 10, if the rated voltage value of the output voltage $V_o$ is 300V, the input voltage $V_{in}$ could be ranged from 3 to 300V. That is, even if the rated voltage value of the input voltage $V_{in}$ is not equal to 100V, the output voltage $V_o$ could be maintained at 300V.

The two-stage switching power supply 1 further comprises a bus capacitor $C_{bus}$. The bus capacitor $C_{bus}$ is connected to the power output terminal of the first-stage power circuit 11, the power input terminal of the second-stage power circuit 12 and the power bus $B_1$. The bus capacitor $C_{bus}$ is used for filtering off the high-frequency noise contained in the bus voltage $V_{bus}$ and storing electrical energy if the input voltage $V_{in}$ is not interrupted. In a case that the input voltage $V_{in}$ is subject to a sudden variation or interruption, the electrical energy stored in the bus capacitor $C_{bus}$ could be converted into the output voltage $V_o$ and the output voltage $V_o$ is no longer immediately influenced by the input voltage $V_{in}$.

The bus voltage $V_{bus}$ outputted from the first-stage power circuit 11 is not necessarily a constant value. By dynamically adjusting the first-stage voltage gain value $G_1$ of the first-stage power circuit 11 and the second-stage voltage gain value $G_2$ of the second-stage power circuit 12, the output voltage $V_o$ or the output current $I_o$ can be maintained at the rated value. Before the input voltage $V_{in}$ is interrupted, the bus voltage $V_{bus}$ of the bus capacitor $C_{bus}$ is reduced at a slow rate because the first-stage voltage gain value $G_1$ and the second-stage voltage gain value $G_2$ are dynamically adjusted. After the input voltage $V_{in}$ is interrupted, the output voltage $V_o$ could be maintained at its rated voltage value for a certain period. For example, after the input voltage $V_{in}$ is interrupted, the output voltage $V_o$ is maintained at its rated voltage value for about 0.5 second (holding time) and then the magnitude of the output voltage $V_o$ is lowered than the rated voltage value or equal to zero. If the input voltage $V_{in}$ has been interrupted for a time period shorter than the holding time (e.g. 0.5 second), the electrical energy stored in the bus capacitor $C_{bus}$ could be converted into the output voltage $V_o$ and the output voltage $V_o$ is slowly reduced to be lower than its rated value.

From the above discussion, the first duty cycle $D_{t1}$ of the first-stage power circuit 11 and the second operating frequency $f_2$ of the second-stage power circuit 12 (e.g. the duty cycle of the first switching circuit 111 and the operating frequency of the second switching circuit 121) are dynamically adjusted by the first-stage control circuit 141 and the second-stage control circuit 142 according to the output detecting signal $V_f$. Since the first-stage voltage gain value $G_1$ and the second-stage voltage gain value $G_2$ are dynamically adjusted according to the output detecting signal $V_f$, the output voltage $V_o$ or the output current $I_o$ is maintained at the rated value. Hereinafter, the relations between the first duty cycle $D_{t1}$, the second operating frequency $f_2$ and the output detecting signal $V_f$ will be illustrated in more details with reference to FIGS. 2A, 2B, 2C and 2D.

Figure 2A:
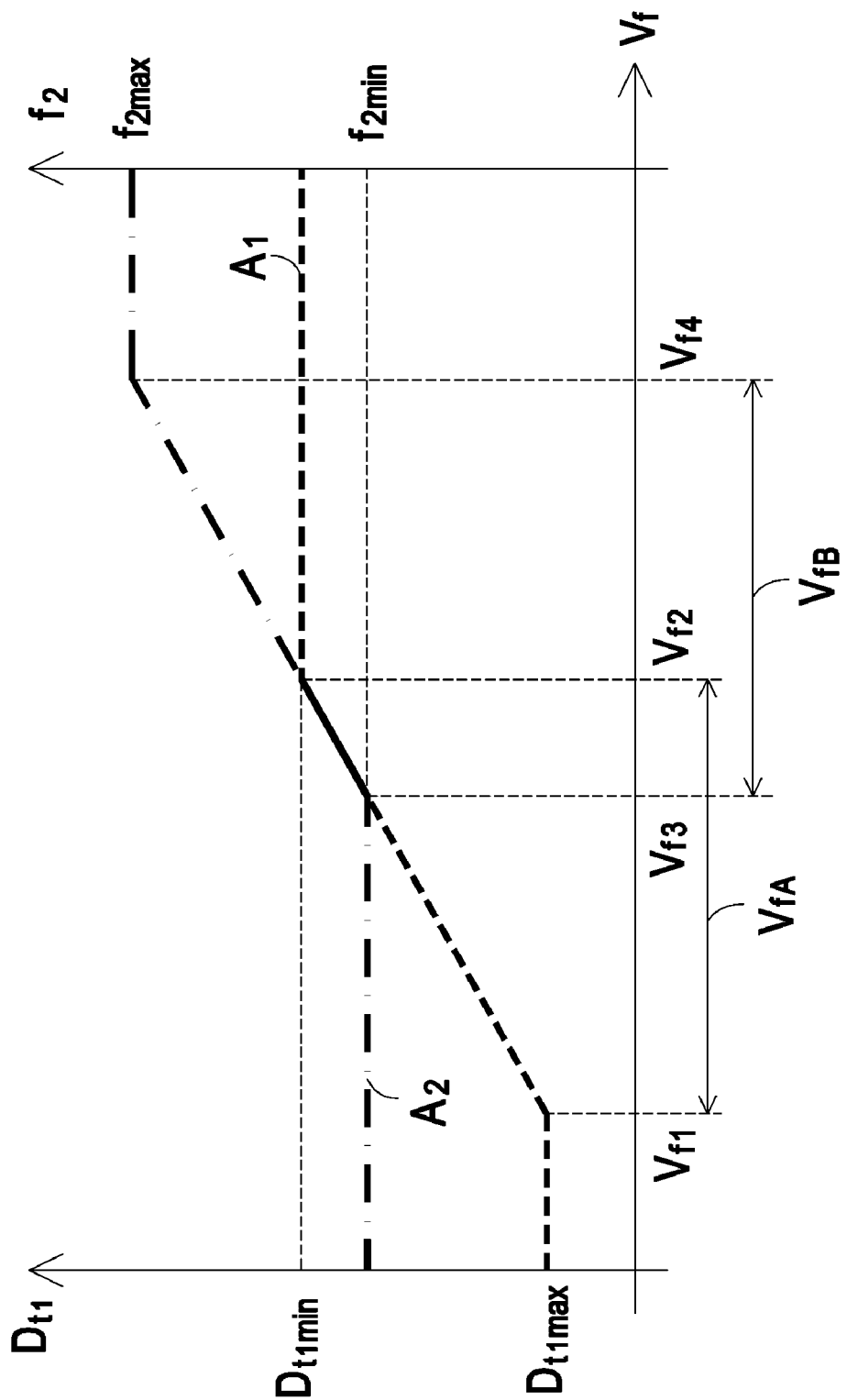
FIG. 2A is a plot illustrating the relation between the first duty cycle, the second operating frequency and the output detecting signal in a first implementing example.

FIG. 2A is a plot illustrating the relation between the first duty cycle, the second operating frequency and the output detecting signal in a first implementing example. As shown in FIG. 2A, the horizontal axle indicates the output detecting signal $V_f$, and the vertical axle indicates the first duty cycle $D_{t1}$ and the second operating frequency $f_2$. The dotted curve $A_1$ denotes the relation between the first duty cycle $D_{t1}$ and the output detecting signal $V_f$. The dotted curve $A_2$ denotes the relation between the second operating frequency $f_2$ and the output detecting signal $V_f$. The overlapped portion of the dotted curve $A_1$ and the dotted curve $A_2$ is expressed as a solid line. From top to bottom, the first duty cycle $D_{t1}$ is gradually decreased from the maximum first duty cycle $D_{t1max}$ to the minimum first duty cycle $D_{t1min}$. From top to bottom, the second operating frequency $f_2$ is gradually increased from the minimum second operating frequency $f_{2min}$ to the maximum second operating frequency $f_{2max}$. From left to right, the output detecting signal $V_f$ is gradually increased. As shown in FIG. 2A, the first signal value range $V_{fA}$ is relatively smaller than the second signal value range $V_{fB}$. In addition, the first output detecting signal value $V_{f1}$ is smaller than the third output detecting signal value $V_{f3}$.

It is found from the dotted curve $A_1$, that the first duty cycle $D_{t1}$ is altered as the output detecting signal $V_f$ is changed. If the magnitude of the output detecting signal $V_f$ is within the first signal value range $V_{fA}$ between the first output detecting signal value $V_{f1}$ and the second output detecting signal value $V_{f2}$, the first duty cycle $D_{t1}$ of the first-stage power circuit 11 is adjusted by the first-stage control circuit 141 of the power control unit 14. Since the first-stage voltage gain value $G_1$ of the first-stage power circuit 11 is in direct proportion to the first duty cycle $D_{t1}$, the first-stage voltage gain value $G_1$ is also adjusted when the first duty cycle $D_{t1}$ of the first-stage power circuit 11 is adjusted by the first-stage control circuit 141 of the power control unit 14. As such, the output voltage $V_o$ or the output current $I_o$ could be maintained at the rated value. If the magnitude of the output detecting signal $V_f$ is smaller than the first output detecting signal value $V_{f1}$, the first duty cycle $D_{t1}$ of the first-stage power circuit 11 is adjusted to be the maximum first duty cycle $D_{t1max}$ under control of the first-stage control circuit 141 of the power control unit 14. Under this circumstance, the maximum value of the first-stage voltage gain value $G_1$ is obtained. Whereas, if the magnitude of the output detecting signal $V_f$ is larger than the second output detecting signal value $V_{f2}$, the first duty cycle $D_{t1}$ of the first-stage power circuit 11 is adjusted to be the minimum first duty cycle $D_{t1min}$ under control of the first-stage control circuit 141 of the power control unit 14. Under this circumstance, the minimum value of the first-stage voltage gain value $G_1$ is obtained.

It is found from the dotted curve $A_2$, that the second operating frequency $f_2$ is altered as the output detecting signal $V_f$ is changed. If the magnitude of the output detecting signal $V_f$ is within the second signal value range $V_{fB}$ between the third output detecting signal value Vf3 and the fourth output detecting signal value $V_{f4}$, the second operating frequency $f_2$ of the second-stage power circuit 12 is adjusted by the second-stage control circuit 142 of the power control unit 14. Since the second-stage voltage gain value $G_2$ of the second-stage power circuit 12 is in reverse proportion to the second operating frequency $f_2$, the second-stage voltage gain value $G_2$ is also adjusted when the second operating frequency $f_2$ of the second-stage power circuit 12 is adjusted by the second-stage control circuit 142 of the power control unit 14. As such, the output voltage $V_o$ or the output current $I_o$ could be maintained at the rated value. If the magnitude of the output detecting signal $V_f$ is smaller than the third output detecting signal value $V_{f3}$, the second operating frequency $f_2$ of the second-stage power circuit 12 is adjusted to be the minimum second operating frequency $f_{2min}$ under control of the second-stage control circuit 142 of the power control unit 14. Under this circumstance, the maximum value of the second-stage voltage gain value $G_2$ is obtained. Whereas, if the magnitude of the output detecting signal $V_f$ is larger than the fourth output detecting signal value $V_{f4}$, the second operating frequency $f_2$ of the second-stage power circuit 12 is adjusted to be the maximum second operating frequency $f_{2max}$ under control of the second-stage control circuit 142 of the power control unit 14. Under this circumstance, the minimum value of the second-stage voltage gain value $G_2$ is obtained.

Figure 2B:
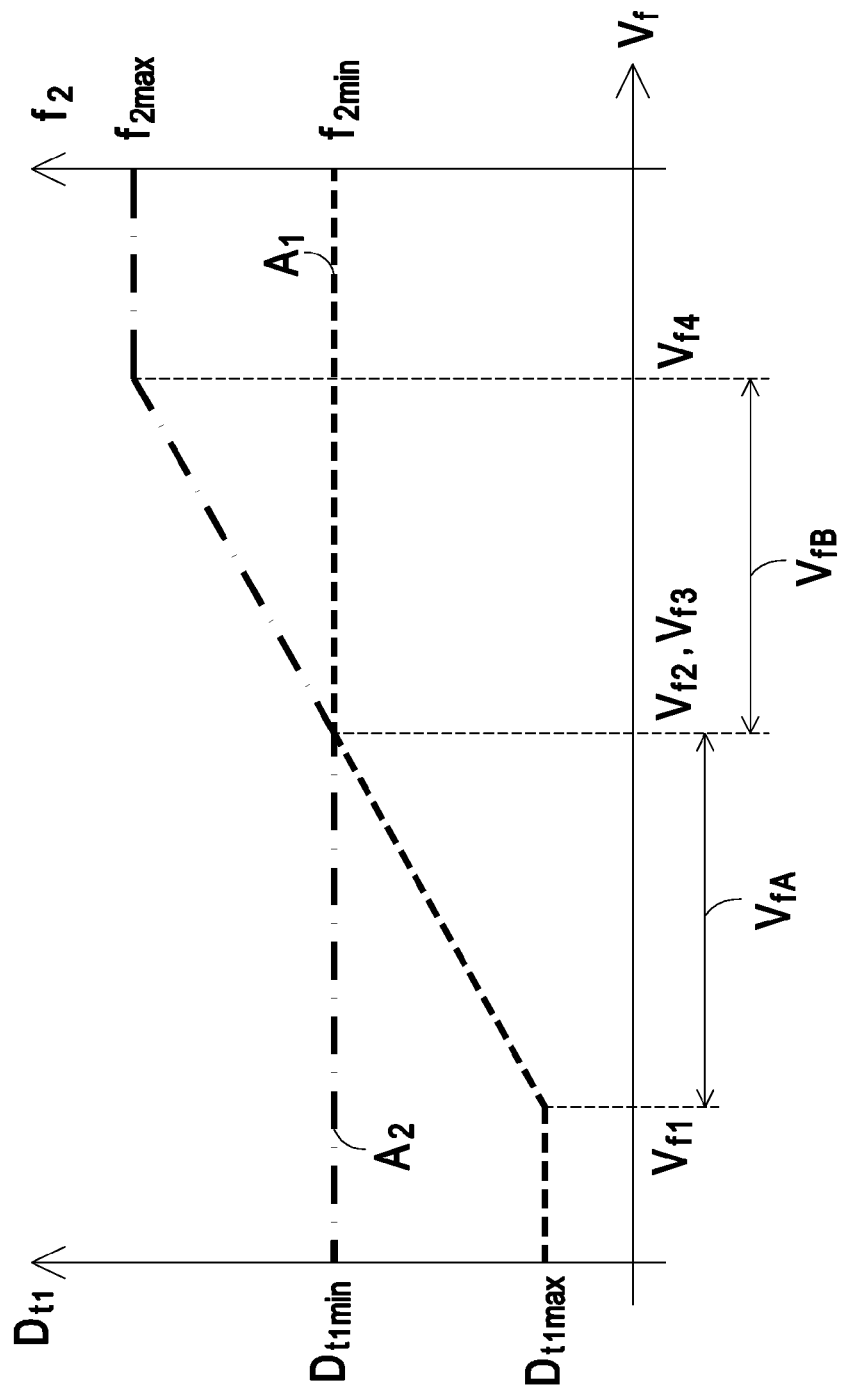
FIG. 2B is a plot illustrating the relation between the first duty cycle, the second operating frequency and the output detecting signal in a second implementing example.

FIG. 2B is a plot illustrating the relation between the first duty cycle, the second operating frequency and the output detecting signal in a second implementing example. In comparison with FIG. 2A, the first signal value range $V_{fA}$ and the second signal value range $V_{fB}$ are not overlapped with each other. In other word, as shown in FIG. 2B, the second output detecting signal value $V_{f2}$ is equal to the third output detecting signal value $V_{f3}$. The first signal value range $V_{fA}$ is relatively smaller than the second signal value range $V_{fB}$. In addition, the first output detecting signal value $V_{f1}$ is smaller than the third output detecting signal value $V_{f3}$.

If the magnitude of the output detecting signal $V_f$ is smaller than the first output detecting signal value $V_{f1}$, the first duty cycle $D_{t1}$ of the first-stage power circuit 11 is adjusted to be the maximum first duty cycle $D_{t1max}$ and thus the maximum value of the first-stage voltage gain value $G_1$ is obtained. At the same time, the second operating frequency $f_2$ of the second-stage power circuit 12 is adjusted to be the minimum second operating frequency $f_{2min}$ and thus the maximum value of the second-stage voltage gain value $G_2$ is obtained.

If the magnitude of the output detecting signal $V_f$ is within the first signal value range $V_{fA}$, the second operating frequency $f_2$ of the second-stage power circuit 12 is adjusted to be the minimum second operating frequency $f_{2min}$ under control of the second-stage control circuit 142 of the power control unit 14. Under this circumstance, the maximum value of the second-stage voltage gain value $G_2$ is obtained. At the same time, the first duty cycle $D_{t1}$ of the first-stage power circuit 11 is adjusted by the first-stage control circuit 141 of the power control unit 14. Under this circumstance, the first-stage voltage gain value $G_1$ is also adjusted and thus the output voltage $V_o$ or the output current $I_o$ is maintained at the rated value.

If the magnitude of the output detecting signal $V_f$ is within the first signal value range $V_{fB}$, the first duty cycle $D_{t1}$ of the first-stage power circuit 11 is adjusted to be the minimum first duty cycle $D_{t1min}$ under control of the first-stage control circuit 141 of the power control unit 14. Under this circumstance, the minimum value of the first-stage voltage gain value $G_1$ is obtained. At the same time, the second operating frequency $f_2$ of the second-stage power circuit 12 is adjusted by the second-stage control circuit 142 of the power control unit 14. Under this circumstance, the second-stage voltage gain value $G_2$ is also adjusted and thus the output voltage $V_o$ or the output current $I_o$ is maintained at the rated value.

If the magnitude of the output detecting signal $V_f$ is larger than the fourth output detecting signal value $V_{f4}$, the first duty cycle $D_{t1}$ of the first-stage power circuit 11 is adjusted to be the minimum first duty cycle $D_{t1min}$ under control of the first-stage control circuit 141 of the power control unit 14. Under this circumstance, the minimum value of the first-stage voltage gain value $G_1$ is obtained. At the same time, the second operating frequency $f_2$ of the second-stage power circuit 12 is adjusted to be the maximum second operating frequency $f_{2max}$ under control of the second-stage control circuit 142 of the power control unit 14. Under this circumstance, the minimum value of the second-stage voltage gain value $G_2$ is obtained.

Figure 2C:
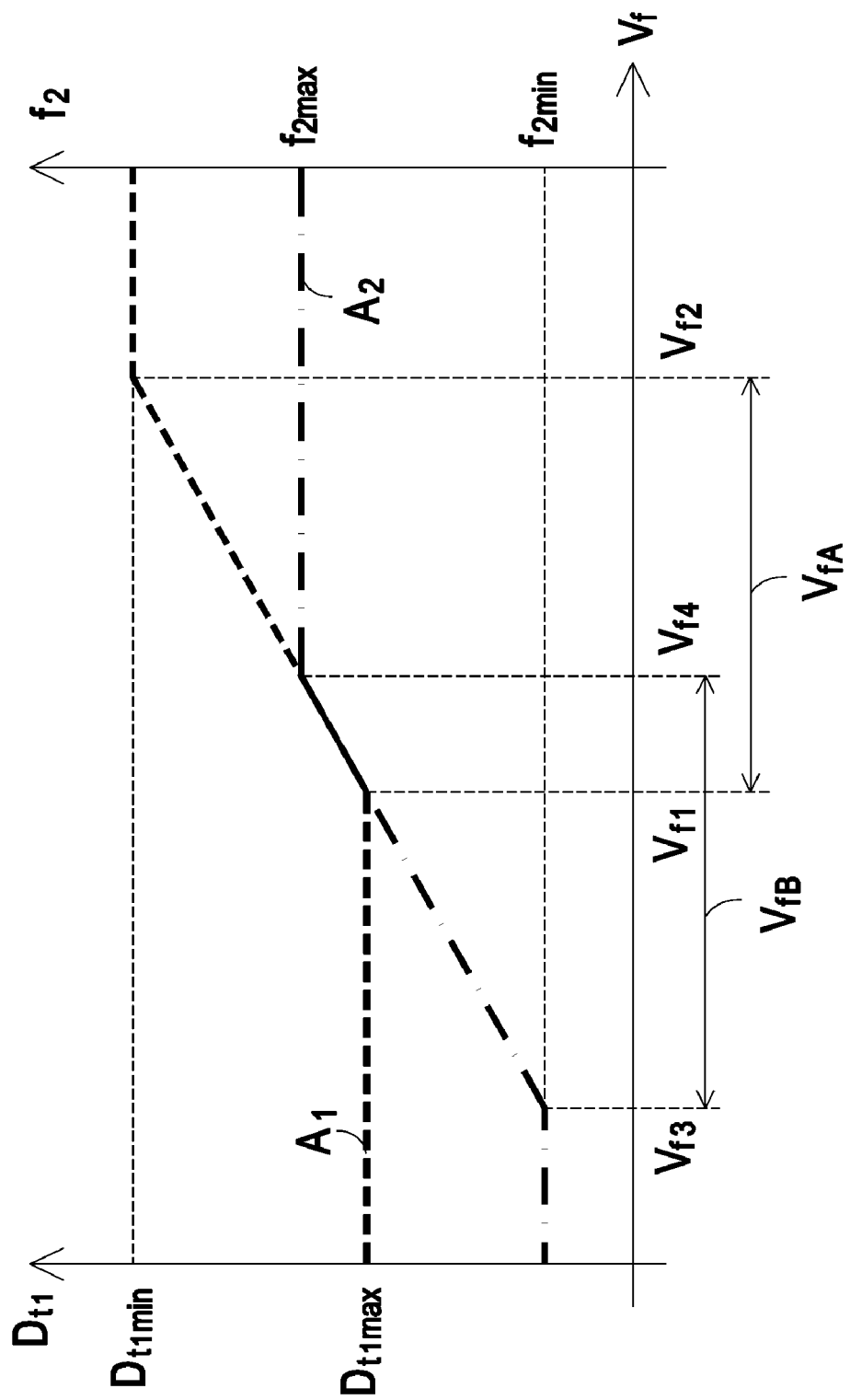
FIG. 2C is a plot illustrating the relation between the first duty cycle, the second operating frequency and the output detecting signal in a third implementing example.

FIG. 2C is a plot illustrating the relation between the first duty cycle, the second operating frequency and the output detecting signal in a third implementing example. In comparison with FIG. 2A, the first signal value range $V_{fA}$ is relatively larger than the second signal value range $V_{fB}$. In addition, the first output detecting signal value $V_{f1}$ is larger than the third output detecting signal value $V_{f3}$.

It is found from the dotted curve $A_2$, that the second operating frequency $f_2$ is altered as the output detecting signal $V_f$ is changed. If the magnitude of the output detecting signal $V_f$ is within the second signal value range $V_{fB}$ between the third output detecting signal value $V_{f3}$ and the fourth output detecting signal value $V_{f4}$, the second operating frequency $f_2$ of the second-stage power circuit 12 is adjusted by the second-stage control circuit 142 of the power control unit 14. Since the second-stage voltage gain value $G_2$ of the second-stage power circuit 12 is in reverse proportion to the second operating frequency $f_2$, the second-stage voltage gain value $G_2$ is also adjusted when the second operating frequency $f_2$ of the second-stage power circuit 12 is adjusted by the second-stage control circuit 142 of the power control unit 14. As such, the output voltage $V_o$ or the output current $I_o$ could be maintained at the rated value. If the magnitude of the output detecting signal $V_f$ is smaller than the third output detecting signal value $V_{f3}$, the second operating frequency $f_2$ of the second-stage power circuit 12 is adjusted to be the minimum second operating frequency $f_{2min}$ under control of the second-stage control circuit 142 of the power control unit 14. Under this circumstance, the maximum value of the second-stage voltage gain value $G_2$ is obtained. Whereas, if the magnitude of the output detecting signal $V_f$ is larger than the fourth output detecting signal value $V_{f4}$, the second operating frequency $f_2$ of the second-stage power circuit 12 is adjusted to be the maximum second operating frequency $f_{2max}$ under control of the second-stage control circuit 142 of the power control unit 14. Under this circumstance, the minimum value of the second-stage voltage gain value $G_2$ is obtained.

It is found from the dotted curve $A_1$, that the first duty cycle $D_{t1}$ is altered as the output detecting signal $V_f$ is changed. If the magnitude of the output detecting signal $V_f$ is within the first signal value range $V_{fA}$ between the first output detecting signal value $V_{f1}$ and the second output detecting signal value $V_{f2}$, the first duty cycle $D_{t1}$ of the first-stage power circuit 11 is adjusted by the first-stage control circuit 141 of the power control unit 14. Since the first-stage voltage gain value $G_1$ of the first-stage power circuit 11 is in direct proportion to the first duty cycle $D_{t1}$, the first-stage voltage gain value $G_1$ is also adjusted when the first duty cycle $D_{t1}$ of the first-stage power circuit 11 is adjusted by the first-stage control circuit 141 of the power control unit 14. As such, the output voltage $V_o$ or the output current $I_o$ could be maintained at the rated value. If the magnitude of the output detecting signal $V_f$ is smaller than the first output detecting signal value $V_{f1}$, the first duty cycle $D_{t1}$ of the first-stage power circuit 11 is adjusted to be the maximum first duty cycle $D_{t1max}$ under control of the first-stage control circuit 141 of the power control unit 14. Under this circumstance, the maximum value of the first-stage voltage gain value $G_1$ is obtained. Whereas, if the magnitude of the output detecting signal $V_f$ is larger than the second output detecting signal value $V_{f2}$, the first duty cycle $D_{t1}$ of the first-stage power circuit 11 is adjusted to be the minimum first duty cycle $D_{t1min}$ under control of the first-stage control circuit 141 of the power control unit 14. Under this circumstance, the minimum value of the first-stage voltage gain value $G_1$ is obtained.

Figure 2D:
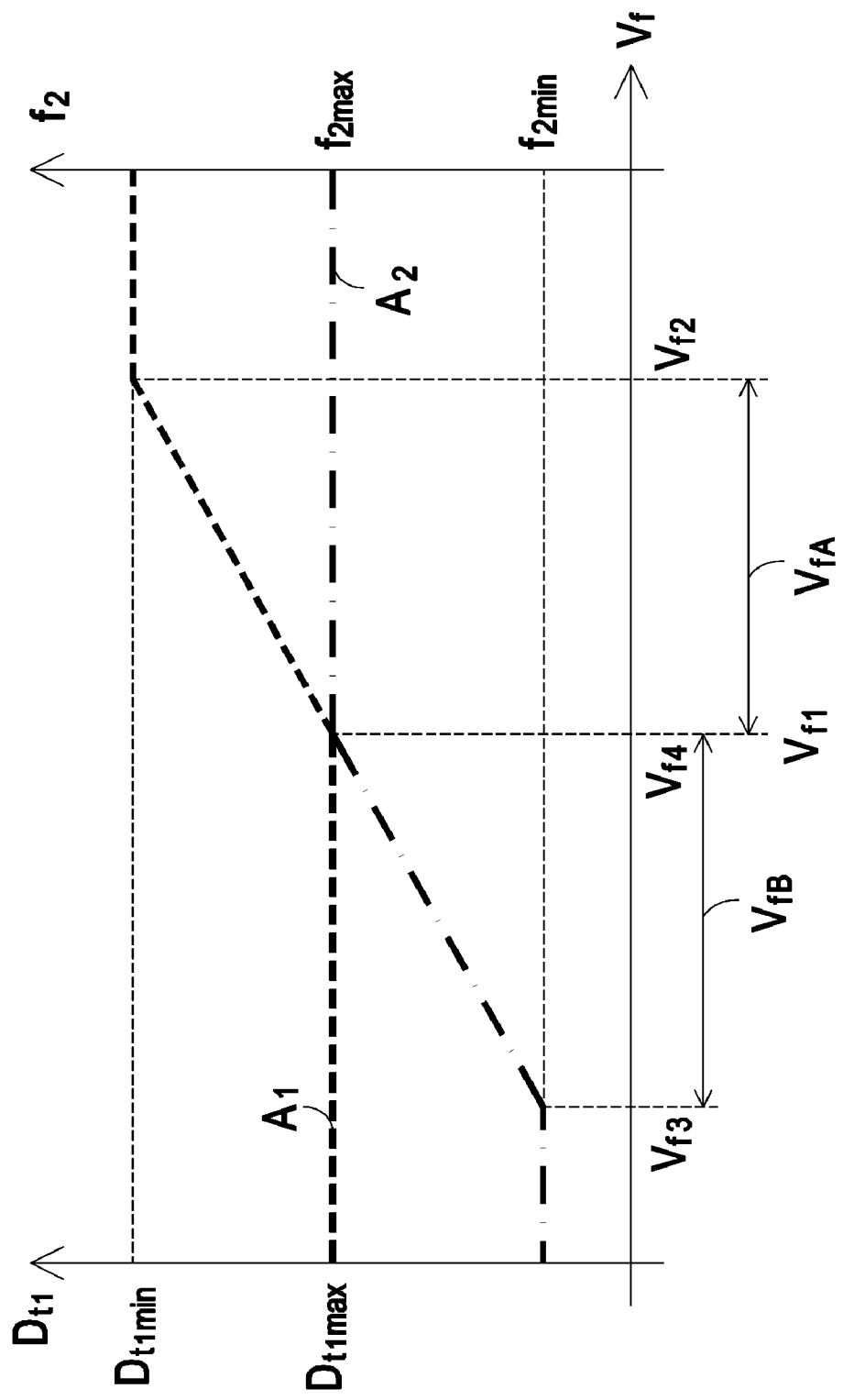
FIG. 2D is a plot illustrating the relation between the first duty cycle, the second operating frequency and the output detecting signal in a fourth implementing example.

FIG. 2D is a plot illustrating the relation between the first duty cycle, the second operating frequency and the output detecting signal in a fourth implementing example. In comparison with FIG. 2C, the first signal value range $V_{fA}$ and the second signal value range $V_{fB}$ are not overlapped with each other. In other word, as shown in FIG. 2D, the first output detecting signal value $V_{f1}$ is equal to the fourth output detecting signal value $V_{f3}$. The first signal value range $V_{fA}$ is relatively larger than the second signal value range $V_{fB}$. In addition, the first output detecting signal value Vf1 is larger than the third output detecting signal value $V_{f3}$.

If the magnitude of the output detecting signal $V_f$ is smaller than the third output detecting signal value $V_{f3}$, the first duty cycle $D_{t1}$ of the first-stage power circuit 11 is adjusted to be the maximum first duty cycle $D_{t1max}$ and thus the maximum value of the first-stage voltage gain value $G_1$ is obtained. At the same time, the second operating frequency $f_2$ of the second-stage power circuit 12 is adjusted to be the minimum second operating frequency $f_{2min}$ and thus the maximum value of the second-stage voltage gain value $G_2$ is obtained.

If the magnitude of the output detecting signal $V_f$ is within the first signal value range $V_{fB}$, the first duty cycle $D_{t1}$ of the first-stage power circuit 11 is adjusted to be the maximum first duty cycle $D_{t1max}$ under control of the first-stage control circuit 141 of the power control unit 14. Under this circumstance, the maximum value of the first-stage voltage gain value $G_1$ is obtained. At the same time, the second operating frequency $f_2$ of the second-stage power circuit 12 is adjusted by the second-stage control circuit 142 of the power control unit 14. Under this circumstance, the second-stage voltage gain value $G_2$ is also adjusted and thus the output voltage $V_o$ or the output current $I_o$ is maintained at the rated value.

If the magnitude of the output detecting signal $V_f$ is within the first signal value range $V_{fA}$, the second operating frequency $f_2$ of the second-stage power circuit 12 is adjusted to be the maximum second operating frequency $f_{2max}$ under control of the second-stage control circuit 142 of the power control unit 14. Under this circumstance, the minimum value of the second-stage voltage gain value $G_2$ is obtained. At the same time, the first duty cycle $D_{t1}$ of the first-stage power circuit 11 is adjusted by the first-stage control circuit 141 of the power control unit 14. Under this circumstance, the first-stage voltage gain value $G_1$ is also adjusted and thus the output voltage $V_o$ or the output current $I_o$ is maintained at the rated value.

If the magnitude of the output detecting signal $V_f$ is larger than the fourth output detecting signal value $V_{f4}$, the first duty cycle $D_{t1}$ of the first-stage power circuit 11 is adjusted to be the minimum first duty cycle $D_{t1min}$ under control of the first-stage control circuit 141 of the power control unit 14. Under this circumstance, the minimum value of the first-stage voltage gain value $G_1$ is obtained. At the same time, the second operating frequency $f_2$ of the second-stage power circuit 12 is adjusted to be the maximum second operating frequency $f_{2max}$ under control of the second-stage control circuit 142 of the power control unit 14. Under this circumstance, the minimum value of the second-stage voltage gain value $G_2$ is obtained.

From the discussion in FIGS. 2A~2D, if the magnitude of the output detecting signal $V_f$ is within the first signal value range $V_{fA}$, the first duty cycle $D_{t1}$ of the first-stage power circuit 11 is decreased as the output detecting signal $V_f$ is increased. In other words, the first-stage voltage gain value $G_1$ is decreased as the output detecting signal $V_f$ is increased. If the magnitude of the output detecting signal $V_f$ is within the second signal value range $V_{fB}$, the second operating frequency $f_2$ of the second-stage power circuit 12 is increased as the output detecting signal $V_f$ is increased. In other words, the second-stage voltage gain value $G_2$ is decreased as the output detecting signal $V_f$ is increased.

Please refer to FIG. 1 again. The output detecting signal $V_f$ generated by the output detecting circuit 13 is in direct proportion to the output voltage $V_o$ and/or the output current $I_o$. As the output voltage $V_o$ and/or the output current $I_o$ is increased, the output detecting signal $V_f$ is increased. The relations shown in FIGS. 2A~2D are illustrated when the output detecting signal $V_f$ is in direct proportion to the output voltage $V_o$ and/or the output current $I_o$.

In some embodiments, the output detecting signal $V_f$ generated by the output detecting circuit 13 is in reverse proportion to the output voltage $V_o$ and/or the output current $I_o$. As the output voltage $V_o$ and/or the output current $I_o$ is increased, the output detecting signal $V_f$ is decreased. The relations between the first duty cycle, the second operating frequency and the output detecting signal are opposed to those shown in FIGS. 2A~2D. If the magnitude of the output detecting signal $V_f$ is within the first signal value range $V_{fA}$, the first duty cycle $D_{t1}$ is increased as the output detecting signal $V_f$ is increased. If the magnitude of the output detecting signal $V_f$ is within the second signal value range $V_{fB}$, the second operating frequency $f_2$ is decreased as the output detecting signal $V_f$ is increased. If the magnitude of the output detecting signal $V_f$ is within the first signal value range $V_{fA}$, the first-stage voltage gain value $G_1$ is increased as the output detecting signal $V_f$ is increased. If the magnitude of the output detecting signal $V_f$ is within the second signal value range $V_{fB}$, the second-stage voltage gain value $G_2$ is increased as the output detecting signal $V_f$ is increased.

Hereinafter, the relations between the first duty cycle $D_{t1}$, the second operating frequency $f_2$ and the output detecting signal $V_f$ will be illustrated in more details with reference to FIGS. 3A, 3B, 3C and 3D.

Figure 3A:
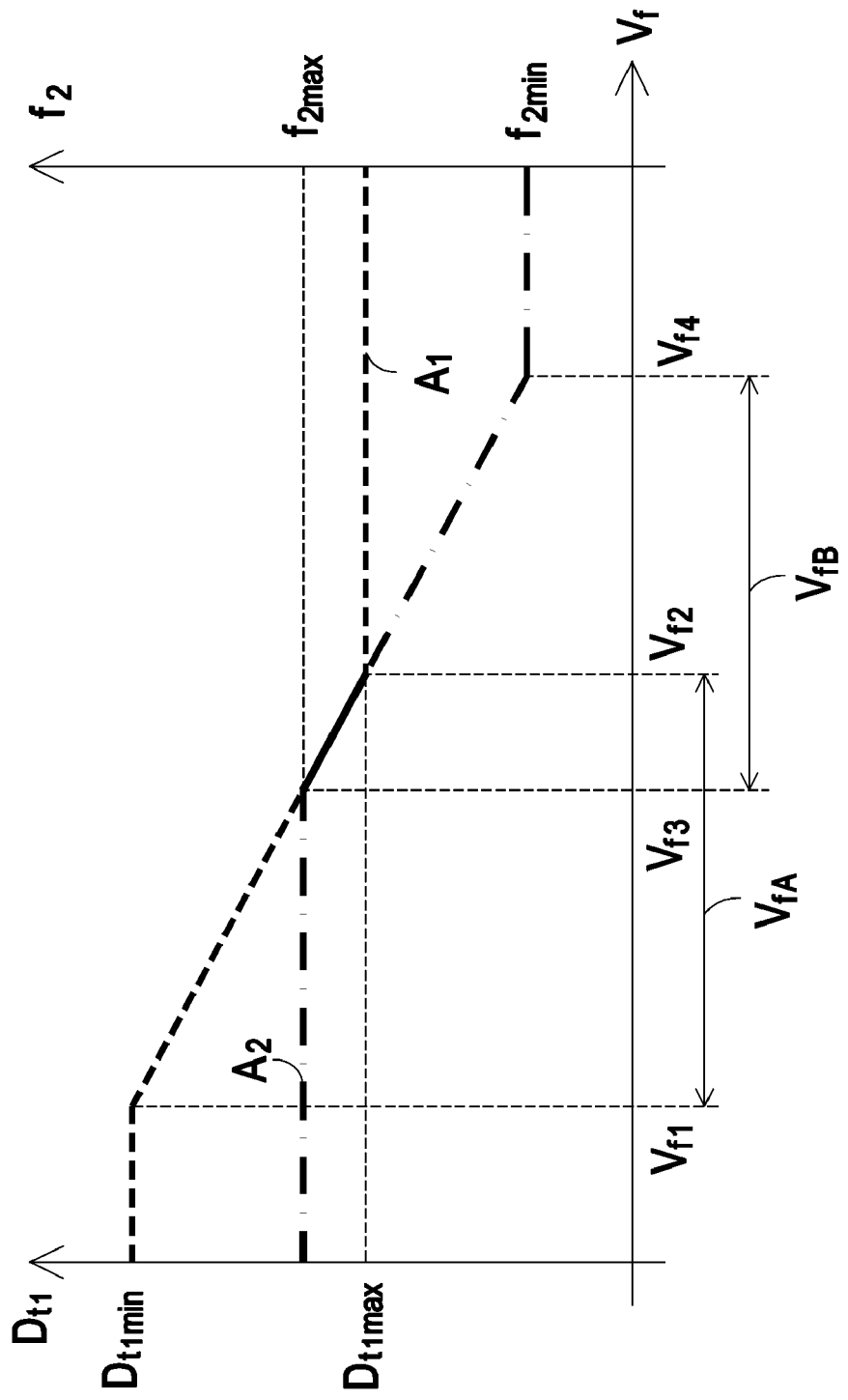
FIG. 3A is a plot illustrating the relation between the first duty cycle, the second operating frequency and the output detecting signal in a fifth implementing example.

FIG. 3A is a plot illustrating the relation between the first duty cycle, the second operating frequency and the output detecting signal in a fifth implementing example. As shown in FIG. 3A, the first signal value range $V_{fA}$ is relatively smaller than the second signal value range $V_{fB}$. In addition, the first output detecting signal value $V_{f1}$ is smaller than the third output detecting signal value $V_{f3}$.

It is found from the dotted curve $A_1$, that the first duty cycle $D_{t1}$ is altered as the output detecting signal $V_f$ is changed. If the magnitude of the output detecting signal $V_f$ is within the first signal value range $V_{fA}$ between the first output detecting signal value $V_{f1}$ and the second output detecting signal value $V_{f2}$, the first duty cycle $D_{t1}$ of the first-stage power circuit 11 is adjusted by the first-stage control circuit 141 of the power control unit 14. The first-stage voltage gain value $G_1$ is also adjusted when the first duty cycle $D_{t1}$ of the first-stage power circuit 11 is adjusted by the first-stage control circuit 141 of the power control unit 14. As such, the output voltage $V_o$ or the output current $I_o$ could be maintained at the rated value. If the magnitude of the output detecting signal $V_f$ is smaller than the first output detecting signal value $V_{f1}$, the first duty cycle $D_{t1}$ of the first-stage power circuit 11 is adjusted to be the minimum first duty cycle $D_{t1min}$ under control of the first-stage control circuit 141 of the power control unit 14. Under this circumstance, the minimum value of the first-stage voltage gain value $G_1$ is obtained. If the magnitude of the output detecting signal $V_f$ is larger than the second output detecting signal value $V_{f2}$, the first duty cycle $D_{t1}$ of the first-stage power circuit 11 is adjusted to be the maximum first duty cycle $D_{t1max}$ under control of the first-stage control circuit 141 of the power control unit 14. Under this circumstance, the maximum value of the first-stage voltage gain value $G_1$ is obtained.

It is found from the dotted curve $A_2$, that the second operating frequency $f_2$ is altered as the output detecting signal $V_f$ is changed. If the magnitude of the output detecting signal $V_f$ is within the second signal value range $V_{fB}$ between the third output detecting signal value $V_{f3}$ and the fourth output detecting signal value $V_{f4}$, the second operating frequency $f_2$ of the second-stage power circuit 12 is adjusted by the second-stage control circuit 142 of the power control unit 14. The second-stage voltage gain value $G_2$ is also adjusted when the second operating frequency $f_2$ of the second-stage power circuit 12 is adjusted by the second-stage control circuit 142 of the power control unit 14. As such, the output voltage $V_o$ or the output current $I_o$ could be maintained at the rated value. If the magnitude of the output detecting signal $V_f$ is smaller than the third output detecting signal value $Vf_3$, the second operating frequency $f_2$ of the second-stage power circuit 12 is adjusted to be the maximum second operating frequency $f_{2min}$ under control of the second-stage control circuit 142 of the power control unit 14. Under this circumstance, the minimum value of the second-stage voltage gain value $G_2$ is obtained. If the magnitude of the output detecting signal $V_f$ is larger than the fourth output detecting signal value $Vf_4$, the second operating frequency $f_2$ of the second-stage power circuit 12 is adjusted to be the minimum second operating frequency $f_{2max}$ under control of the second-stage control circuit 142 of the power control unit 14. Under this circumstance, the maximum value of the second-stage voltage gain value $G_2$ is obtained.

Figure 3B:
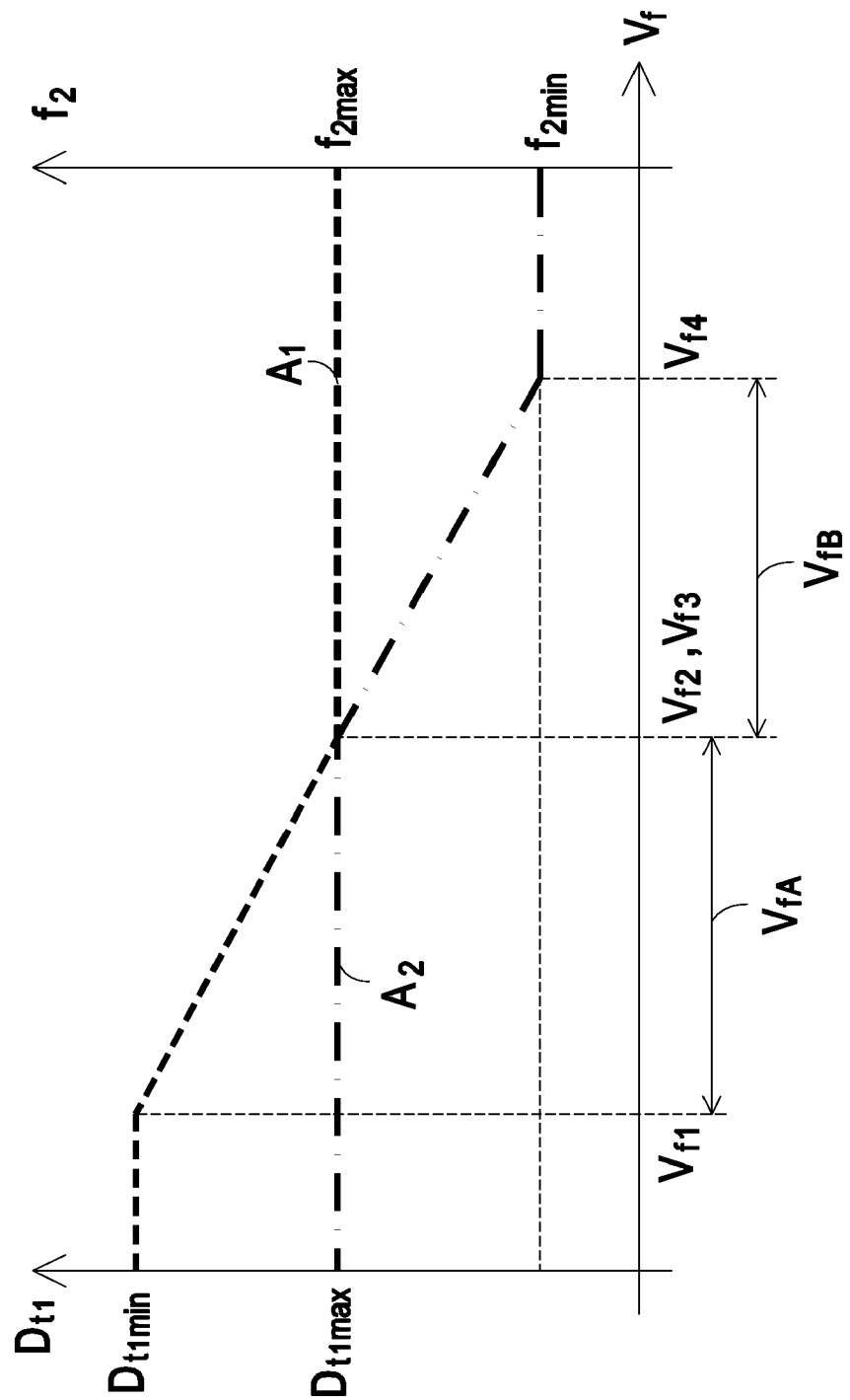
FIG. 3B is a plot illustrating the relation between the first duty cycle, the second operating frequency and the output detecting signal in a sixth implementing example.

FIG. 3B is a plot illustrating the relation between the first duty cycle, the second operating frequency and the output detecting signal in a sixth implementing example. In comparison with FIG. 3A, the first signal value range $V_{fA}$ and the second signal value range $V_{fB}$ are not overlapped with each other. In other word, as shown in FIG. 3B, the second output detecting signal value $V_{f2}$ is equal to the third output detecting signal value $V_{f3}$. The first signal value range $V_{fA}$ is relatively smaller than the second signal value range $V_{fB}$. In addition, the first output detecting signal value $V_{f1}$ is smaller than the third output detecting signal value $V_{f3}$.

If the magnitude of the output detecting signal $V_f$ is smaller than the first output detecting signal value $V_{f1}$, the first duty cycle $D_{t1}$ of the first-stage power circuit 11 is adjusted to be the minimum first duty cycle $D_{t1min}$ and thus the minimum value of the first-stage voltage gain value $G_1$ is obtained. At the same time, the second operating frequency $f_2$ of the second-stage power circuit 12 is adjusted to be the maximum second operating frequency $f_{2min}$ and thus the minimum value of the second-stage voltage gain value $G_2$ is obtained.

If the magnitude of the output detecting signal $V_f$ is within the first signal value range $V_{fA}$, the second operating frequency $f_2$ of the second-stage power circuit 12 is adjusted to be the maximum second operating frequency $f_{2max}$ under control of the second-stage control circuit 142 of the power control unit 14. Under this circumstance, the minimum value of the second-stage voltage gain value $G_2$ is obtained. At the same time, the first duty cycle $D_{t1}$ of the first-stage power circuit 11 is adjusted by the first-stage control circuit 141 of the power control unit 14. Under this circumstance, the first-stage voltage gain value $G_1$ is also adjusted and thus the output voltage $V_o$ or the output current $I_o$ is maintained at the rated value.

If the magnitude of the output detecting signal $V_f$ is within the first signal value range $V_{fB}$, the first duty cycle $D_{t1}$ of the first-stage power circuit 11 is adjusted to be the maximum first duty cycle $D_{t1max}$ under control of the first-stage control circuit 141 of the power control unit 14. Under this circumstance, the maximum value of the first-stage voltage gain value $G_1$ is obtained. At the same time, the second operating frequency $f_2$ of the second-stage power circuit 12 is adjusted by the second-stage control circuit 142 of the power control unit 14. Under this circumstance, the second-stage voltage gain value $G_2$ is also adjusted and thus the output voltage $V_o$ or the output current $I_o$ is maintained at the rated value.

If the magnitude of the output detecting signal $V_f$ is larger than the fourth output detecting signal value $V_{f4}$, the first duty cycle $D_{t1}$ of the first-stage power circuit 11 is adjusted to be the maximum first duty cycle $D_{t1max}$ under control of the first-stage control circuit 141 of the power control unit 14. Under this circumstance, the maximum value of the first-stage voltage gain value $G_1$ is obtained. At the same time, the second operating frequency $f_2$ of the second-stage power circuit 12 is adjusted to be the minimum second operating frequency $f_{2max}$ under control of the second-stage control circuit 142 of the power control unit 14. Under this circumstance, the maximum value of the second-stage voltage gain value $G_2$ is obtained.

Figure 3C:
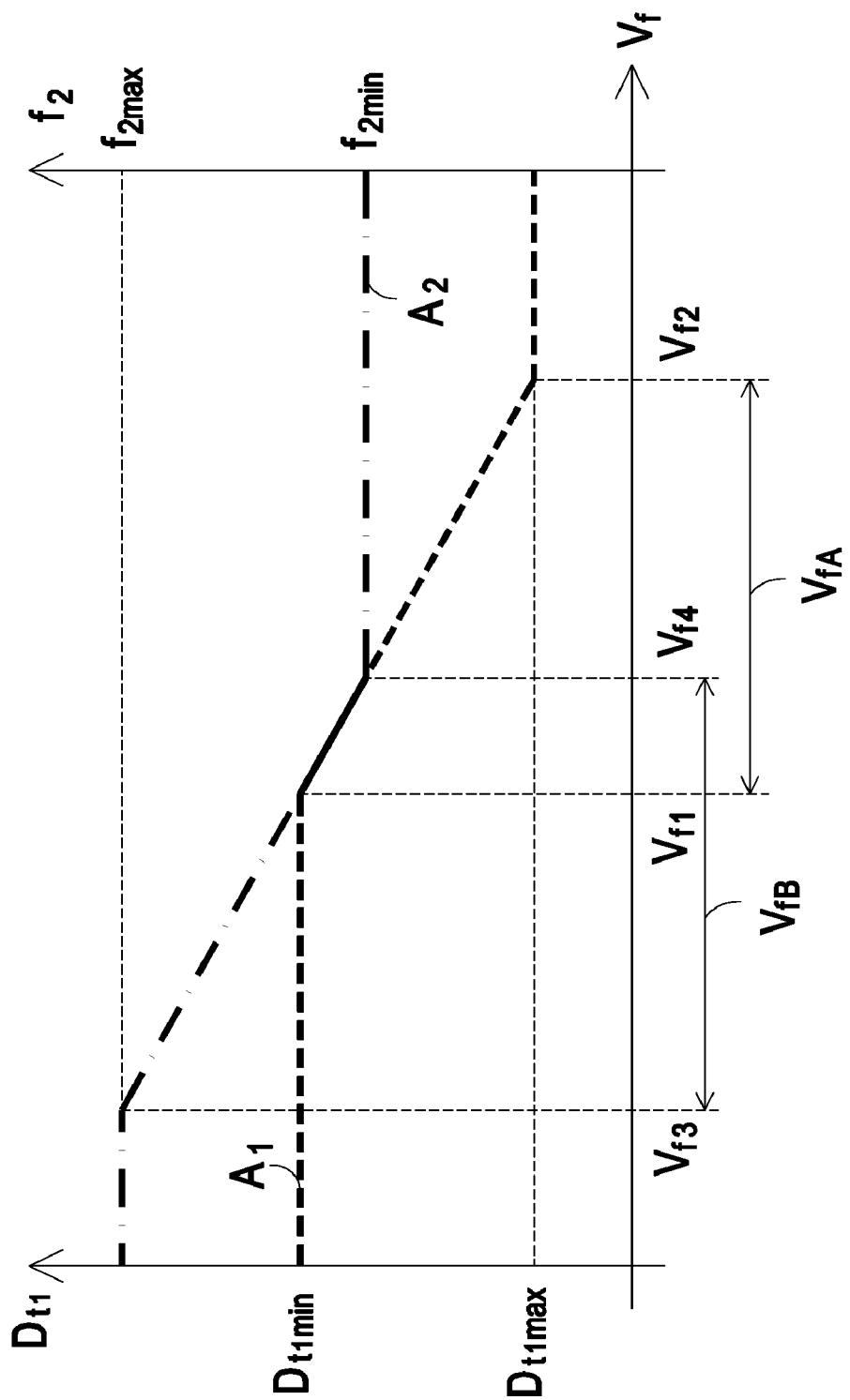
FIG. 3C is a plot illustrating the relation between the first duty cycle, the second operating frequency and the output detecting signal in a seventh implementing example.

FIG. 3C is a plot illustrating the relation between the first duty cycle, the second operating frequency and the output detecting signal in a seventh implementing example. In comparison with FIG. 3A, the first signal value range $V_{fA}$ is relatively larger than the second signal value range $V_{fB}$. In addition, the first output detecting signal value $V_{f1}$ is larger than the third output detecting signal value $V_{f3}$.

It is found from the dotted curve $A_2$, that the second operating frequency $f_2$ is altered as the output detecting signal $V_f$ is changed. If the magnitude of the output detecting signal $V_f$ is within the second signal value range $V_{fB}$ between the third output detecting signal value $V_{f3}$ and the fourth output detecting signal value $V_{f4}$, the second operating frequency $f_2$ of the second-stage power circuit 12 is adjusted by the second-stage control circuit 142 of the power control unit 14. The second-stage voltage gain value $G_2$ is also adjusted when the second operating frequency $f_2$ of the second-stage power circuit 12 is adjusted by the second-stage control circuit 142 of the power control unit 14. As such, the output voltage $V_o$ or the output current $I_o$ could be maintained at the rated value. If the magnitude of the output detecting signal $V_f$ is smaller than the third output detecting signal value $V_{f3}$, the second operating frequency $f_2$ of the second-stage power circuit 12 is adjusted to be the maximum second operating frequency $f_{2max}$ under control of the second-stage control circuit 142 of the power control unit 14. Under this circumstance, the minimum value of the second-stage voltage gain value $G_2$ is obtained. Whereas, if the magnitude of the output detecting signal $V_f$ is larger than the fourth output detecting signal value $V_{f4}$, the second operating frequency $f_2$ of the second-stage power circuit 12 is adjusted to be the minimum second operating frequency $f_{2min}$ under control of the second-stage control circuit 142 of the power control unit 14. Under this circumstance, the maximum value of the second-stage voltage gain value $G_2$ is obtained.

It is found from the dotted curve $A_1$, that the first duty cycle $D_{t1}$ is altered as the output detecting signal $V_f$ is changed. If the magnitude of the output detecting signal $V_f$ is within the first signal value range $V_{fA}$ between the first output detecting signal value $V_{f1}$ and the second output detecting signal value $V_{f2}$, the first duty cycle $D_{t1}$ of the first-stage power circuit 11 is adjusted by the first-stage control circuit 141 of the power control unit 14. The first-stage voltage gain value $G_1$ is also adjusted when the first duty cycle $D_{t1}$ of the first-stage power circuit 11 is adjusted by the first-stage control circuit 141 of the power control unit 14. As such, the output voltage $V_o$ or the output current $I_o$ could be maintained at the rated value. If the magnitude of the output detecting signal $V_f$ is smaller than the first output detecting signal value $V_{f1}$, the first duty cycle $D_{t1}$ of the first-stage power circuit 11 is adjusted to be the minimum first duty cycle $D_{t1min}$ under control of the first-stage control circuit 141 of the power control unit 14. Under this circumstance, the minimum value of the first-stage voltage gain value $G_1$ is obtained. If the magnitude of the output detecting signal $V_f$ is larger than the second output detecting signal value $V_{f2}$, the first duty cycle $D_{t1}$ of the first-stage power circuit 11 is adjusted to be the maximum first duty cycle $D_{t1max}$ under control of the first-stage control circuit 141 of the power control unit 14. Under this circumstance, the maximum value of the first-stage voltage gain value $G_1$ is obtained.

Figure 3D:
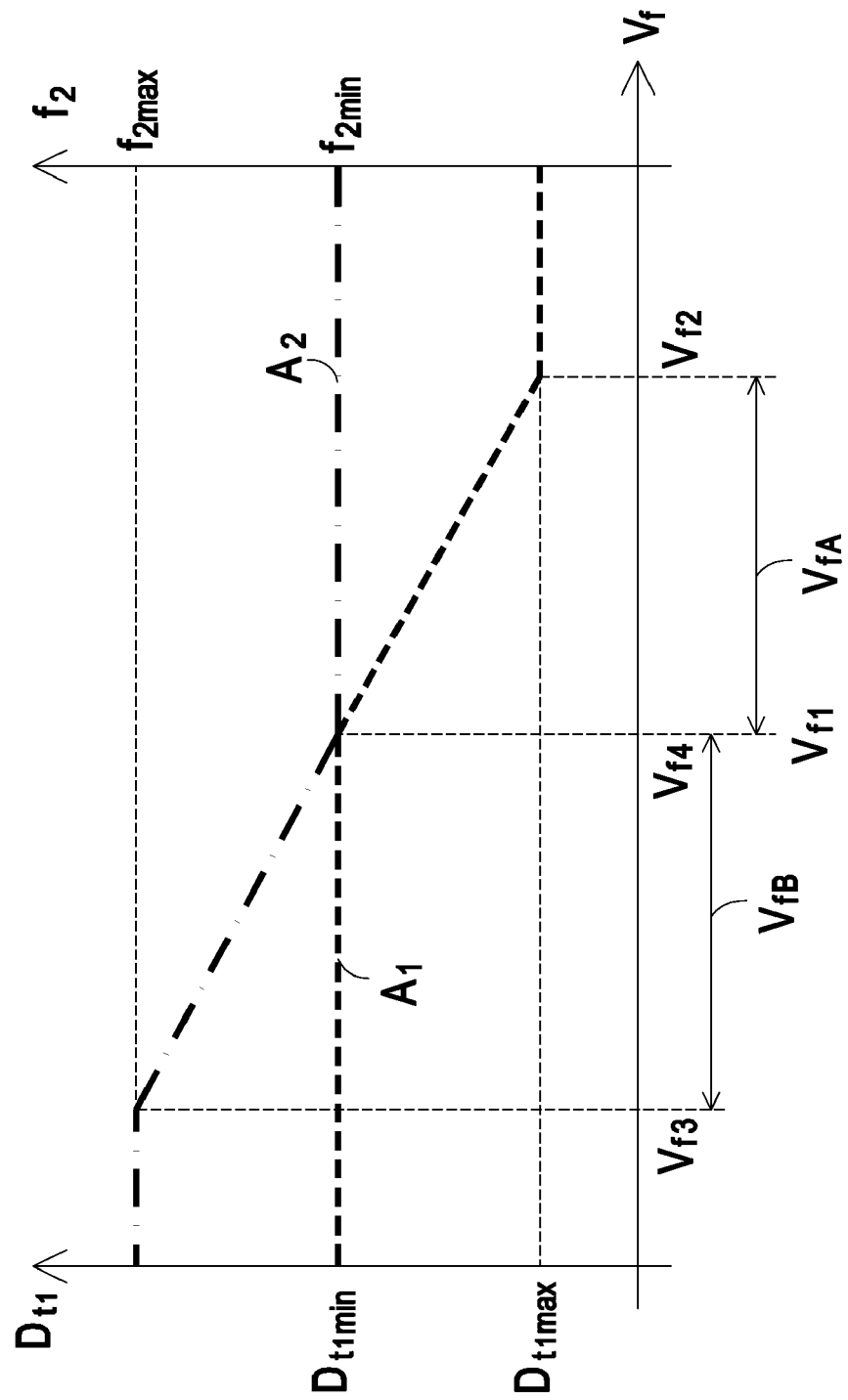
FIG. 3D is a plot illustrating the relation between the first duty cycle, the second operating frequency and the output detecting signal in an eighth implementing example.

FIG. 3D is a plot illustrating the relation between the first duty cycle, the second operating frequency and the output detecting signal in an eighth implementing example. In comparison with FIG. 3C, the first signal value range $V_{fA}$ and the second signal value range $V_{fB}$ are not overlapped with each other. In other word, as shown in FIG. 3D, the first output detecting signal value $V_{f1}$ is equal to the fourth output detecting signal value $V_{f3}$. The first signal value range $V_{fA}$ is relatively larger than the second signal value range $V_{fB}$. In addition, the first output detecting signal value Vf1 is larger than the third output detecting signal value $V_{f3}$.

If the magnitude of the output detecting signal $V_f$ is smaller than the third output detecting signal value $V_{f3}$, the first duty cycle $D_{t1}$ of the first-stage power circuit 11 is adjusted to be the minimum first duty cycle $D_{t1min}$ and thus the minimum value of the first-stage voltage gain value $G_1$ is obtained. At the same time, the second operating frequency $f_2$ of the second-stage power circuit 12 is adjusted to be the maximum second operating frequency $f_{2max}$ and thus the minimum value of the second-stage voltage gain value $G_2$ is obtained.

If the magnitude of the output detecting signal $V_f$ is within the first signal value range $V_{fB}$, the first duty cycle $D_{t1}$ of the first-stage power circuit 11 is adjusted to be the minimum first duty cycle $D_{t1min}$ under control of the first-stage control circuit 141 of the power control unit 14. Under this circumstance, the minimum value of the first-stage voltage gain value $G_1$ is obtained. At the same time, the second operating frequency $f_2$ of the second-stage power circuit 12 is adjusted by the second-stage control circuit 142 of the power control unit 14. Under this circumstance, the second-stage voltage gain value $G_2$ is also adjusted and thus the output voltage $V_o$ or the output current $I_o$ is maintained at the rated value.

If the magnitude of the output detecting signal $V_f$ is within the first signal value range $V_{fA}$, the second operating frequency $f_2$ of the second-stage power circuit 12 is adjusted to be the minimum second operating frequency $f_{2min}$ under control of the second-stage control circuit 142 of the power control unit 14. Under this circumstance, the maximum value of the second-stage voltage gain value $G_2$ is obtained. At the same time, the first duty cycle $D_{t1}$ of the first-stage power circuit 11 is adjusted by the first-stage control circuit 141 of the power control unit 14. Under this circumstance, the first-stage voltage gain value $G_1$ is also adjusted and thus the output voltage $V_o$ or the output current $I_o$ is maintained at the rated value If the magnitude of the output detecting signal $V_f$ is larger than the fourth output detecting signal value $V_{f4}$, the first duty cycle $D_{t1}$ of the first-stage power circuit 11 is adjusted to be the minimum first duty cycle $D_{t1min}$ under control of the first-stage control circuit 141 of the power control unit 14. Under this circumstance, the maximum value of the first-stage voltage gain value $G_1$ is obtained. At the same time, the second operating frequency $f_2$ of the second-stage power circuit 12 is adjusted to be the minimum second operating frequency $f_{2min}$ under control of the second-stage control circuit 142 of the power control unit 14. Under this circumstance, the maximum value of the second-stage voltage gain value $G_2$ is obtained.

Figure 4A:
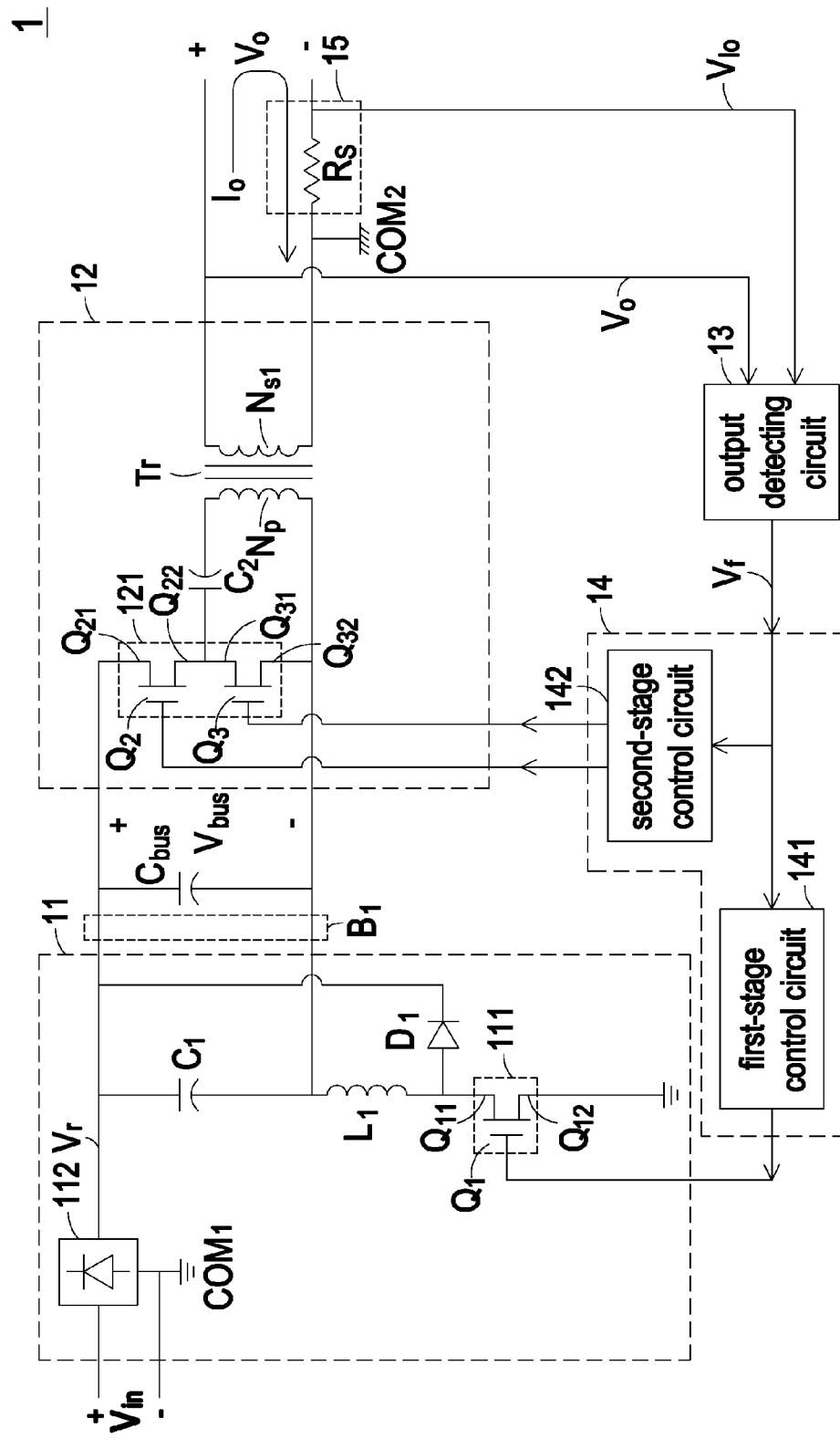
FIG. 4A is a schematic detailed circuit diagram of a first exemplary two-stage switching power supply of the present invention.

FIG. 4A is a schematic detailed circuit diagram of a first exemplary two-stage switching power supply of the present invention. As shown in FIG. 4A, the first-stage power circuit 11 includes the first switching circuit 111, a first-stage rectifier circuit 112, a first capacitor $C_1$, a first inductor $L_1$ and a first diode $D_1$. The first-stage power circuit 11 includes a first switch element $Q_1$. A first terminal $Q_{11}$ of the first switch element $Q_1$ is connected to a first end of the first inductor $L_1$ and the anode of the first diode $D_1$. A second terminal $Q_{12}$ of the first switch element $Q_1$ is connected to a first common terminal COM1. A control terminal of the first switch element $Q_1$ is connected to the first-stage control circuit 141 of the power control unit 14. The first switch element $Q_1$ is conducted or shut off under control of the first-stage control circuit 141.

The first end of the first inductor $L_1$ is connected to the anode of the first diode $D_1$ and the first terminal $Q_{11}$ of the first switch element $Q_1$. The second end of the first inductor $L_1$ is connected to the first end of the first capacitor $C_1$ and the negative end of the power bus $B_1$. The first end of the first capacitor $C_1$ is connected to the negative end of the power bus $B_1$ and the second end of the first inductor $L_1$. The second end of the first capacitor $C_1$ is connected to the output terminal of the first-stage rectifier circuit 112, the cathode of the first diode $D_1$ and the positive end of the power bus $B_1$. The output terminal of the first-stage rectifier circuit 112 is connected to the second end of the first capacitor $C_1$, the cathode of the first diode $D_1$ and the positive end of the power bus $B_1$ for rectifying the input voltage $V_{in}$ into a rectified input voltage $V_r$. An example of the first-stage rectifier circuit 112 is a bridge-type rectifier. The cathode of the first diode $D_1$ is connected to the positive end of the power bus $B_1$. The anode of the first diode $D_1$ is connected to first end of the first inductor $L_1$. When the first switch element $Q_1$ is shut off, the electrical energy stored in the first inductor $L_1$ is transmitted to the power input terminal of the second-stage power circuit 12 through the first diode $D_1$ and the power bus $B_1$.

The second-stage power circuit 12 comprises the second switching circuit 121, a second capacitor $C_2$ and a transformer $T_r$. The transformer $T_r$ has a primary winding assembly $N_p$ and a first secondary winding assembly $N_{s1}$. The second switching circuit 121 includes a second switch element $Q_2$ and a third switch element $Q_3$. A first end of the primary winding assembly $N_p$ is connected to a first end of the second capacitor $C_2$. A second end of the primary winding assembly $N_p$ is connected to the negative end of the power bus $B_1$ and a second terminal $Q_{32}$ of the third switch element $Q_3$. A second end of the second capacitor $C_2$ is connected to a second terminal $Q_{22}$ of the second switch element $Q_2$ and a first terminal $Q_{31}$ of the third switch element $Q_3$.

A first terminal $Q_{21}$ of the second switch element $Q_2$ is connected to the positive end of the power bus $B_1$. The second terminal $Q_{22}$ of the second switch element $Q_2$ is connected to the first terminal $Q_{31}$ of the third switch element $Q_3$ and the second end of the second capacitor $C_2$. The first terminal $Q_{31}$ of the third switch element $Q_3$ is connected to the second end of the second capacitor $C_2$ and the second terminal $Q_{22}$ of the second switch element $Q_2$. The second terminal $Q_{32}$ of the third switch element $Q_3$ is connected to the negative end of the power bus $B_1$ and the second end of the primary winding assembly $N_p$.

The control terminals of the second switch element $Q_2$ and the third switch element $Q_3$ are connected to the second-stage control circuit 142 of the power control unit 14. The second switch element $Q_2$ and the third switch element $Q_3$ are conducted or shut off under control of the second-stage control circuit 142. As such, the electrical energy of the bus voltage $V_{bus}$ is magnetically transmitted from the primary winding assembly $N_p$ to the first secondary winding assembly $N_{s1}$, thereby generating the output voltage $V_o$.

In this embodiment, the two-stage switching power supply 1 further comprises an output current detecting circuit 15. The output current detecting circuit 15 is serially connected to the loop of the output current $I_o$ for detecting the output current $I_o$ and generating a corresponding output current detecting signal $V_{Io}$. An example of the output current detecting circuit 15 includes but is not limited to an output detecting resistor $R_s$. A first end of the output detecting resistor $R_s$ is connected to the first secondary winding assembly $N_{s1}$ and a second common terminal COM2. A second end of the output detecting resistor $R_s$ is connected to the input terminal of the output detecting circuit 13. Since the output detecting resistor $R_s$ is serially connected to the loop of the output current $I_o$, the output current $I_o$ will flow through the output detecting resistor $R_s$ and generating a corresponding output current detecting signal $V_{Io}$. In some embodiments, the output detecting circuit 13 is a current transformer (CT).

The input terminal of the output detecting circuit 13 is connected to the power output terminal of the second-stage power circuit 12 and the output terminal of the output current detecting circuit 15. The output terminal of the output detecting circuit 13 is connected to the first-stage control circuit 141 and the second-stage control circuit 142 of the power control unit 14. According to the output voltage $V_o$ and the output current detecting signal $V_{Io}$, the output detecting circuit 13 generates a corresponding an output detecting signal $V_f$. Since the output current detecting signal $V_{Io}$ is altered as the output current $I_o$ is changed, the output detecting signal $V_f$ is generated according to the output voltage $V_o$ and the output current $I_o$. The operations of the first switching circuit 111 and the second switching circuit 121 have been mentioned above, and are not redundantly described herein.

Figure 4B:
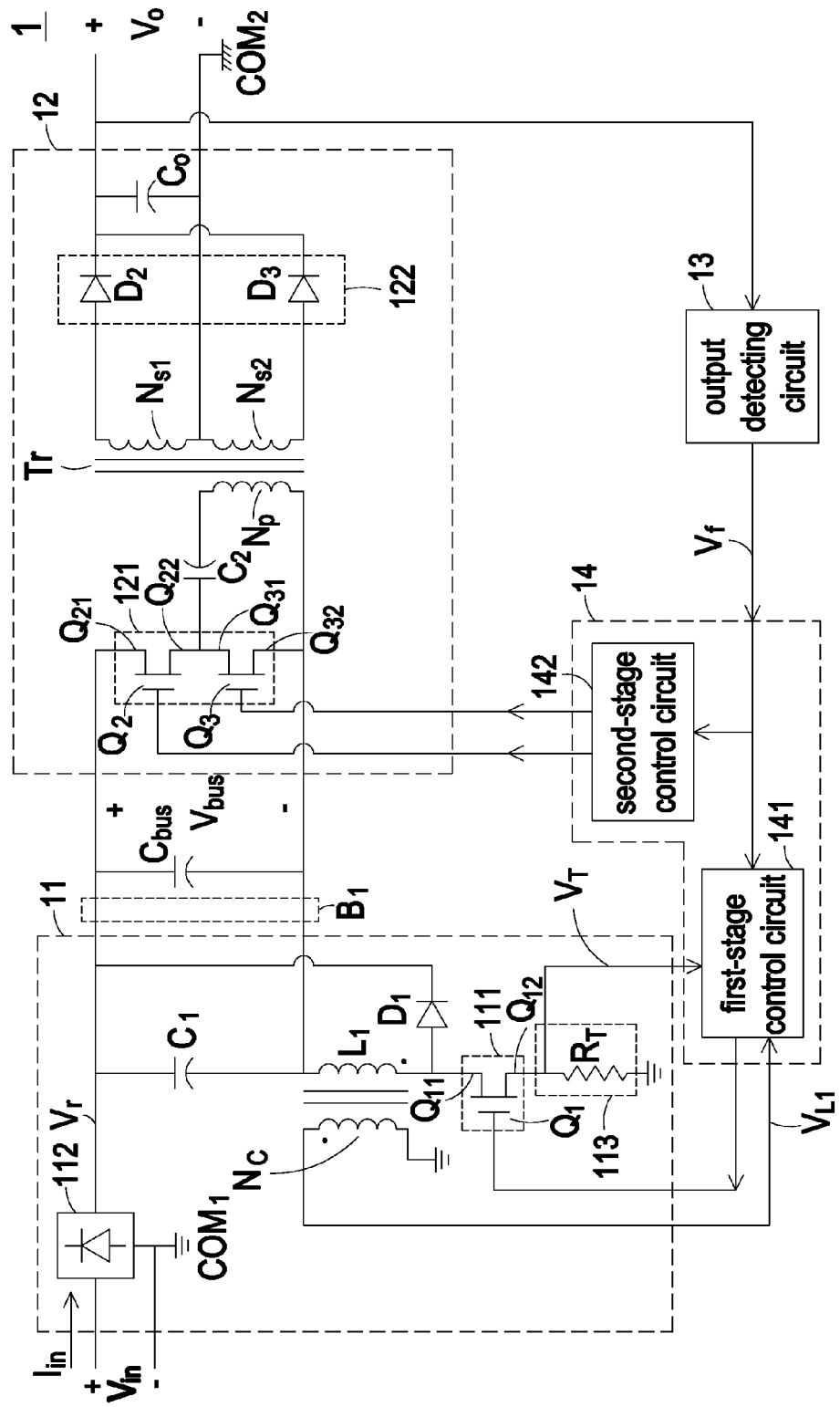
FIG. 4B is a schematic detailed circuit diagram of a second exemplary two-stage switching power supply of the present invention.

FIG. 4B is a schematic detailed circuit diagram of a second exemplary two-stage switching power supply of the present invention. As shown in FIG. 4B, the first-stage power circuit 11 includes the first switching circuit 111, a first-stage rectifier circuit 112, a first capacitor $C_1$, a first inductor $L_1$, a first diode $D_1$ and further a charging current detecting circuit 113. In addition, the first inductor $L_1$ further includes a current-induction winding $N_c$. The second-stage power circuit 12 comprises the second switching circuit 121, a second capacitor $C_2$, a transformer $T_r$ and further a second-stage rectifier circuit 122 and an output capacitor $C_o$. In addition, the transformer $T_r$ further includes a second secondary winding assembly $N_{s2}$.

As shown in FIG. 4B, the charging current detecting circuit 113 is serially connected to the charging loop of the first inductor $L_1$. According to the charging current of the first inductor $L_1$, the charging current detecting circuit 113 generates a corresponding charging current detecting signal $V_T$. An example of the charging current detecting circuit 113 is a charging detecting resistor $R_T$. An end of the charging detecting resistor $R_T$ is connected to the second terminal $Q_{12}$ of the first switch element $Q_1$. The other end of the charging detecting resistor $R_T$ is connected to the first common terminal COM1. When the first switch element $Q_1$ of the first switching circuit 111 is conducted, the charging current of the first inductor $L_1$ will successively flow through the first-stage rectifier circuit 112, the first capacitor $C_1$, the first inductor $L_1$, the first switch element $Q_1$ of the first switching circuit 111 and the charging detecting resistor $R_T$ of the charging current detecting circuit 113, thereby charging first inductor $L_1$. At this moment, the charging detecting resistor $R_T$ of the charging current detecting circuit 113 will generate the charging current detecting signal $V_T$ according to the charging current of the first inductor $L_1$.

The current-induction winding $N_c$ is used for inducing a current of the first inductor $L_1$ and issuing a corresponding first inductor current inducing signal $V_{L1}$. When the first switch element $Q_1$ of the first switching circuit 111 is conducted, the charging current of the first inductor $L_1$ will successively flow through the first-stage rectifier circuit 112, the first capacitor $C_1$, the first inductor $L_1$, the first switch element $Q_1$ of the first switching circuit 111 and the charging detecting resistor $R_T$ of the charging current detecting circuit 113, thereby charging first inductor $L_1$. Meanwhile, the current-induction winding $N_c$ generates the first inductor current inducing signal $V_{L1}$ according to the charging current of the first inductor $L_1$. When the first switch element $Q_1$ of the first switching circuit 111 is shut off, the current of the first inductor $L_1$ will successively flow through the first diode $D_1$, the first capacitor $C_1$, the first inductor $L_1$, thereby discharging electricity. As such, the he current-induction winding $N_c$ generates the first inductor current inducing signal $V_{L1}$ according to the discharging current of the first inductor $L_1$.

Figure 5:
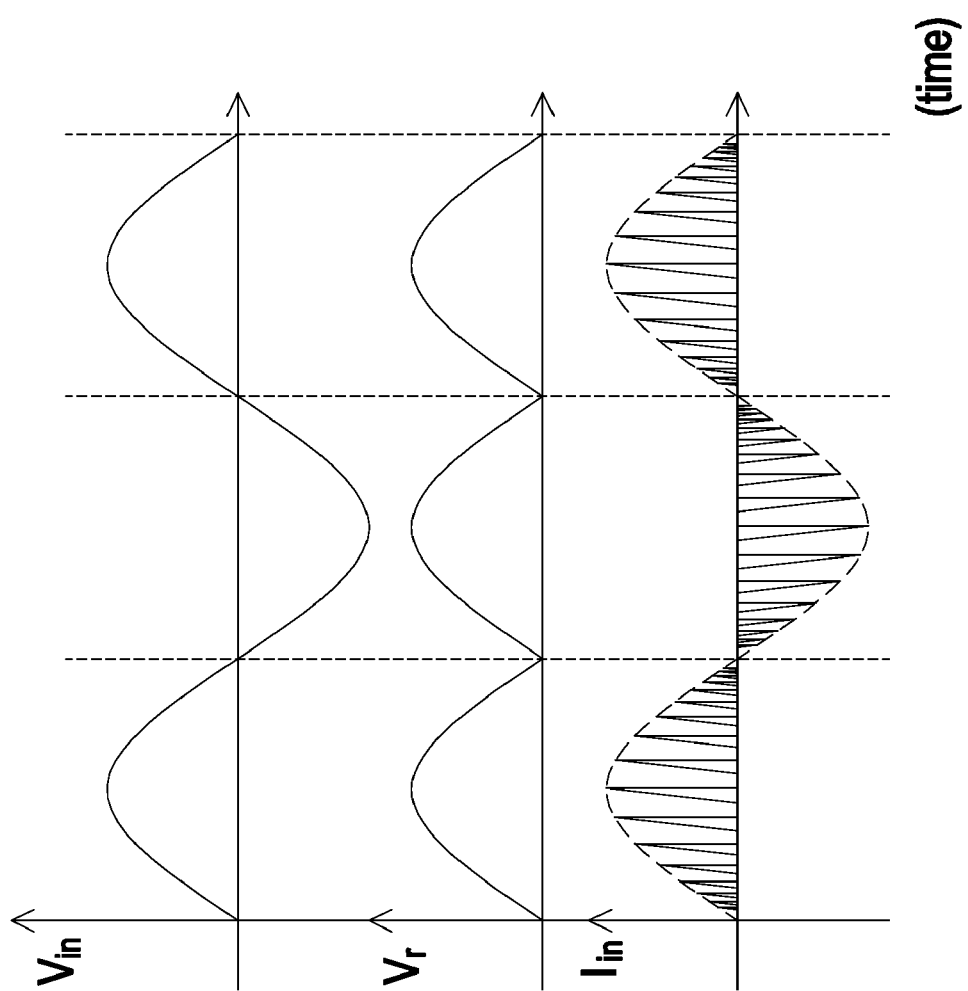
FIG. 5 is a timing waveform diagram schematically illustrating related voltage signals and current signals described in the two-stage switching power supply of FIG. 4B.

FIG. 5 is a timing waveform diagram schematically illustrating related voltage signals and current signals described in the two-stage switching power supply of FIG. 4B. As shown in FIG. 4B, the first-stage control circuit 141 of the power control unit 14 is connected to the output terminal of the output detecting circuit 13, the control terminal of the first switch element $Q_1$ of the first switching circuit 111, the current-induction winding $N_c$ and the charging detecting resistor $R_T$ of the charging current detecting circuit 113. The operations of the first switch element $Q_1$ of the first switching circuit 111 (e.g. the duty cycle of the first switch element $Q_1$) is controlled by the first-stage control circuit 141 of the power control unit 14 according to the output detecting signal $V_f$. In addition, the operations of the first switch element $Q_1$ is adjusted by the first-stage control circuit 141 according to the charging current detecting signal $V_T$ and the first inductor current inducing signal $V_{L1}$. Therefore, as shown in FIG. 5, the envelop curve of the input current $I_{in}$ is similar to the waveform of the input voltage $V_{in}$. Under this circumstance, the AC input current is decentralized and the power factor correction function is achieved.

Please refer to FIG. 4B again. The second-stage rectifier circuit 122 is interconnected between the secondary side of the transformer $T_r$ and the power output terminal of the second-stage power circuit 12 for rectification. The second-stage rectifier circuit 122 includes a second diode $D_2$ and a third diode $D_3$. The anode of the second diode $D_2$ is connected to the first secondary winding assembly $N_{s1}$. The cathode of the second diode $D_2$ is connected to a first end of the output capacitor $C_o$ and the power output terminal of the second-stage power circuit 12. The anode of the third diode $D_3$ is connected to the second secondary winding assembly $N_{s2}$. The cathode of the third diode $D_3$ is connected to the first end of the output capacitor $C_o$ and the power output terminal of the second-stage power circuit 12.

In this embodiment, the secondary side of the transformer $T_r$ includes the first secondary winding assembly $N_{s1}$ and the second secondary winding assembly $N_{s2}$. The first secondary winding assembly $N_{s1}$ and the second secondary winding assembly $N_{s2}$ are collectively connected to the second common terminal COM2 and a second end of the output capacitor $C_o$. When the second switch element $Q_2$ and the third switch element $Q_3$ of the second switching circuit 121 are alternately conducted, the electrical energy of the bus voltage $V_{bus}$ is magnetically transmitted from the primary winding assembly $N_p$ to the first secondary winding assembly $N_{s1}$ and the second secondary winding assembly $N_{s2}$, thereby generating the output voltage $V_o$.

For example, in a case that the second switch element $Q_2$ is conducted but the third switch element $Q_3$ is shut off, the electrical energy of the bus voltage $V_{bus}$ is magnetically transmitted from the primary winding assembly $N_p$ to the first secondary winding assembly $N_{s1}$ and then rectified by the second-stage rectifier circuit 122, thereby generating the output voltage $V_o$. Whereas, in a case that the second switch element $Q_2$ is shut off but the third switch element $Q_3$ is conducted, the electrical energy of the bus voltage $V_{bus}$ is magnetically transmitted from the primary winding assembly $N_p$ to the second secondary winding assembly $N_{s2}$ and then rectified by the second-stage rectifier circuit 122, thereby generating the output voltage $V_o$.

It is noted that, however, those skilled in the art will readily observe that numerous modifications and alterations may be made while retaining the teachings of the invention. For example, the first-stage power circuit 11 of the two-stage switching power supply 1 can be a boost-type, a buck-type or a buck-boost type power circuit. The second first-stage power circuit 12 of the two-stage switching power supply 1 can be a LLC resonant circuit or a LCC resonant circuit.

In the above embodiments, the first-stage control circuit 141 and the second-stage control circuit 142 of the power control unit 14 are illustrated by referring to PWM controllers. Nevertheless, the first-stage control circuit 141 and the second-stage control circuit 142 of the power control unit 14 can be pulse frequency modulation (PFM) controllers or digital signal processors (DSPs). In some embodiments, the first-stage control circuit 141 and the second-stage control circuit 142 can be integrated into a single chip.

Examples of the first switching element $Q_1$, the second switching element $Q_2$ and the third switching element $Q_3$ include but are not limited to bipolar junction transistors (BJTs) or metal oxide semiconductor field effect transistors (MOSFETs).

From the above description, the bus voltage outputted from the first-stage power circuit of the two-stage switching power supply is not necessarily a constant value. By controlling operations of the first switching circuit of the first-stage power circuit and the second switching circuit of the second-stage power circuit, the first-stage voltage gain value of the first-stage power circuit and the second-stage voltage gain value of the second-stage power circuit are dynamically adjusted and thus the output voltage or the output current could be maintained at the rated value. As such, the operating flexibilities of the first switching circuit and the second switching circuit are enhanced, and the two-stage switching power supply could receive the input voltage having a broader variation range. Even if the bus voltage is altered as the input voltage is subject to a sudden variation, the output voltage is no longer suddenly changed. In other words, if the input voltage is subject to a sudden variation or interruption, the adverse influence on the output voltage is minimized. Since the envelop curve of the input current is similar to the waveform of the input voltage, the two-stage switching power supply of the present invention has the power factor correction function without the need of adding a power factor correction circuit. As a result, the two-stage switching power supply of the present invention is simplified and cost-effective.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A two-stage switching power supply for receiving an input voltage and generating an output voltage, said two-stage switching power supply comprising:

a first-stage power circuit connected to a power bus for receiving an input voltage, and comprising a first switching circuit, wherein said input voltage is converted into a bus voltage by conducting or shutting off said first switching circuit;

a second-stage power circuit connected to said power bus for receiving said bus voltage, and comprising a second switching circuit, wherein said bus voltage is converted into said output voltage by conducting or shutting off said second switching circuit;

an output detecting circuit connected to said second-stage power circuit and generating an output detecting signal according to said output voltage and/or an output current; and a power control unit connected to a control terminal of said first switching circuit of said first-stage power circuit and a control terminal of said second switching circuit of said second-stage power circuit for controlling operations of said first switching circuit and said second switching circuit according to said output detecting signal, wherein a first-stage voltage gain value of said first-stage power circuit and a second-stage voltage gain value of said second-stage power circuit are altered as said output detecting signal is changed, so that said output voltage or said output current is maintained at a rated value, wherein said bus voltage is dynamically adjusted according to said output detecting signal.

2. The two-stage switching power supply according to claim 1 wherein power control unit comprises:
   a first-stage control circuit connected to said control terminal of said first switching circuit of said first-stage power circuit and said output detecting circuit for controlling operations of said first switching circuit, so that said first-stage voltage gain value of said first-stage power circuit is dynamically altered according to said output detecting signal; and
   a second-stage control circuit connected to said control terminal of said second switching circuit of said second-stage power circuit and said output detecting circuit for controlling operations of said second switching circuit, so that said second-stage voltage gain value of said second-stage power circuit is dynamically altered according to said output detecting signal.

3. The two-stage switching power supply according to claim 2 wherein said first-stage control circuit and said second-stage control circuit are pulse width modulation controllers, pulse frequency modulation controllers or digital signal processors, which are integrated into a single chip.

4. The two-stage switching power supply according to claim 1 wherein if the magnitude of said output detecting signal is within a first signal value range between a first output detecting signal value and a second output detecting signal value, a first duty cycle or said first-stage voltage gain value of said first-stage power circuit is dynamically adjusted by said power control unit according to said output detecting signal, and if the magnitude of said output detecting signal is within a second signal value range between a third output detecting signal value and a fourth output detecting signal value, a second operating frequency or said second-stage voltage gain value of said first-stage power circuit is dynamically adjusted by said power control unit according to said output detecting signal.

5. The two-stage switching power supply according to claim 4 wherein the magnitude of said output detecting signal is in direct proportion to said output voltage and/or said output current.

6. The two-stage switching power supply according to claim 5 wherein if the magnitude of said output detecting signal is within said first signal value range, said first duty cycle is decreased and said first-stage voltage gain value is decreased as said output detecting signal is increased, and if the magnitude of said output detecting signal is within said second signal value range, said second operating frequency is increased but said second-stage voltage gain value is decreased as said output detecting signal is increased.

7. The two-stage switching power supply according to claim 5 wherein if the magnitude of said output detecting signal is smaller than said first signal value range, said first duty cycle is adjusted to a maximum value and said first-stage voltage gain value is adjusted to a maximum value by said power control unit, and if the magnitude of said output detecting signal is larger than said first signal value range, said first duty cycle is adjusted to a minimum value and said first-stage voltage gain value is adjusted to a minimum value by said power control unit.

8. The two-stage switching power supply according to claim 5 wherein if the magnitude of said output detecting signal is smaller than said second signal value range, said second operating frequency is adjusted to a minimum value but said second-stage voltage gain value is adjusted to a maximum value by said power control unit, and if the magnitude of said output detecting signal is larger than said second signal value range, said second operating frequency is adjusted to a maximum value but said second-stage voltage gain value is adjusted to a minimum value by said power control unit.

9. The two-stage switching power supply according to claim 4 wherein the magnitude of said output detecting signal is in reverse proportion to said output voltage and/or said output current.

10. The two-stage switching power supply according to claim 9 wherein if the magnitude of said output detecting signal is within said first signal value range, said first duty cycle is increased and said first-stage voltage gain value is increased as said output detecting signal is increased, and if the magnitude of said output detecting signal is within said second signal value range, said second operating frequency is decreased but said second-stage voltage gain value is increased as said output detecting signal is increased.

11. The two-stage switching power supply according to claim 9 wherein if the magnitude of said output detecting signal is smaller than said first signal value range, said first duty cycle is adjusted to a minimum value and said first-stage voltage gain value is adjusted to a minimum value by said power control unit, and if the magnitude of said output detecting signal is larger than said first signal value range, said first duty cycle is adjusted to a maximum value and said first-stage voltage gain value is adjusted to a maximum value by said power control unit.

12. The two-stage switching power supply according to claim 9 wherein if the magnitude of said output detecting signal is smaller than said second signal value range, said second operating frequency is adjusted to a maximum value but said second-stage voltage gain value is adjusted to a minimum value by said power control unit, and if the magnitude of said output detecting signal is larger than said second signal value range, said second operating frequency is adjusted to a minimum value but said second-stage voltage gain value is adjusted to a maximum value by said power control unit.

13. The two-stage switching power supply according to claim 1 further comprising a bus capacitor, which is connected to a power output terminal of said first-stage power circuit, a power input terminal of said second-stage power circuit and said power bus, for filtering off high-frequency noise contained in said bus voltage.

14. The two-stage switching power supply according to claim 1 wherein said first-stage power circuit includes:
   a first inductor having a first end connected to said first switching circuit and a second end connected to a negative terminal of said power bus;
   a first capacitor having an first end connected to said negative terminal of said power bus and said second end of said first inductor and a second end connected to a positive terminal of said power bus;
   a first-stage rectifier circuit having an output terminal connected to said second end of said first capacitor for rectifying said input voltage into a rectified input voltage; and
   a first diode having a cathode connected to positive terminal of said power bus and an anode connected to said first end of said first inductor.

15. The two-stage switching power supply according to claim 14 wherein said first inductor further includes a current-induction winding for inducing a current of said first inductor and issuing a corresponding first inductor current inducing signal, said first-stage power circuit further includes a charging current detecting circuit serially connected to a charging loop of said first inductor for generating a charging current detecting signal according to a charging current of the first inductor, said power control unit is further connected to said current-induction winding and said charging current detecting circuit, and said operations of said first switching circuit are adjusted according to said charging current detecting signal and said first inductor current inducing signal, so that the envelop curve of an input current is similar to the waveform of said input voltage.

16. The two-stage switching power supply according to claim 15 wherein said charging current detecting circuit is a charging detecting resistor or a current transformer.

17. The two-stage switching power supply according to claim 1 wherein said second-stage power circuit comprises:
   a second capacitor having an end connected to said second switching circuit; and
   a transformer including a primary winding assembly and a first secondary winding assembly, said primary winding assembly having a first end connected to the other end of said second capacitor and a second end connected to said negative terminal of said power bus and said second switching circuit, wherein said second switching circuit is conducted or shut off under control of said second-stage control circuit, so that electrical energy of said bus voltage is magnetically transmitted from said primary winding assembly to said first secondary winding assembly to generate said output voltage.

18. The two-stage switching power supply according to claim 17 further comprising an output current detecting circuit, which is serially connected to a loop of said output current for detecting said output current and generating a corresponding output current detecting signal, wherein an input end of said output detecting circuit is connected to an output terminal of said output current detecting circuit, said output current detecting signal is altered as said output current is changed, and said output detecting circuit generates said output detecting signal according to said output voltage and said output current detecting signal.

19. The two-stage switching power supply according to claim 18 wherein said output current detecting circuit is an output detecting resistor or a current transformer.

20. The two-stage switching power supply according to claim 19 wherein said transformer further comprises a second secondary winding assembly, and said second-stage power circuit further comprises:
   a second-stage rectifier circuit interconnected between a secondary side of said transformer and a power output terminal of said second-stage power circuit; and
   an output capacitor connected to said power output terminal of said second-stage power circuit.

* * * * *